United States Patent
Kim et al.

(10) Patent No.: US 9,871,638 B2
(45) Date of Patent: *Jan. 16, 2018

(54) METHOD FOR TRANSMITTING UPLINK CONTROL INFORMATION, USER EQUIPMENT, METHOD FOR RECEIVING UPLINK CONTROL INFORMATION, AND BASE STATION

(71) Applicant: LG ELECTRONICS INC., Seoul (KR)

(72) Inventors: Hakseong Kim, Anyang-si (KR); Kijun Kim, Anyang-si (KR); Hanbyul Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/428,796

(22) Filed: Feb. 9, 2017

(65) Prior Publication Data

US 2017/0155489 A1 Jun. 1, 2017

Related U.S. Application Data

(63) Continuation of application No. 14/973,426, filed on Dec. 17, 2015, now Pat. No. 9,602,264, which is a
(Continued)

(51) Int. Cl.
*H04W 80/04* (2009.01)
*H04L 5/00* (2006.01)
(Continued)

(52) U.S. Cl.
CPC .......... *H04L 5/0055* (2013.01); *H04L 1/1854* (2013.01); *H04L 1/1861* (2013.01);
(Continued)

(58) Field of Classification Search
CPC ..... H04W 28/00; H04W 47/10; H04W 80/04; H04W 72/04; H04W 72/042; H04W 28/04; H04W 88/06
See application file for complete search history.

(56) References Cited

U.S. PATENT DOCUMENTS

2010/0322114 A1 12/2010 Li et al.
2011/0012893 A1 1/2011 Iriguchi et al.
(Continued)

FOREIGN PATENT DOCUMENTS

| KR | 10-2010-0108423 A | 10/2010 |
|---|---|---|
| WO | WO 2010/056078 A2 | 5/2010 |
| WO | WO 2010/110598 A2 | 9/2010 |

*Primary Examiner* — Andrew Lee
(74) *Attorney, Agent, or Firm* — Birch, Stewart, Kolasch & Birch, LLP

(57) ABSTRACT

A method for transmitting an uplink signal by a user equipment in a wireless communication system, including receiving, by the user equipment, an enhanced physical downlink control channel (EPDCCH); receiving, by the user equipment, a physical downlink shared channel (PDSCH) based on the EPDCCH; and transmitting acknowledgement/negative acknowledgement (ACK/NACK) information corresponding to the PDSCH using a PUCCH resource, wherein the PUCCH resource is determined based on an index of an enhanced control channel element (eCCE) for an EPDCCH and an index of an antenna port used for EPDCCH transmission.

14 Claims, 15 Drawing Sheets

Related U.S. Application Data continuation of application No. 14/123,067, filed as application No. PCT/KR2012/004938 on Jun. 22, 2012, now Pat. No. 9,246,656.

(60) Provisional application No. 61/512,383, filed on Jul. 27, 2011, provisional application No. 61/500,620, filed on Jun. 24, 2011.

(51) Int. Cl.
  *H04L 1/18* (2006.01)
  *H04W 72/04* (2009.01)
  *H04L 1/00* (2006.01)
  *H04L 1/16* (2006.01)

(52) U.S. Cl.
  CPC ..... *H04W 72/042* (2013.01); *H04W 72/0413* (2013.01); *H04W 72/0446* (2013.01); *H04L 1/0026* (2013.01); *H04L 1/1671* (2013.01); *H04L 5/0007* (2013.01)

(56) References Cited

U.S. PATENT DOCUMENTS

| | | |
|---|---|---|
| 2011/0126071 A1 | 5/2011 | Han et al. |
| 2013/0230030 A1 | 9/2013 | Papasakellariou et al. |
| 2014/0036803 A1 | 2/2014 | Park |
| 2014/0050165 A1 | 2/2014 | Park |
| 2014/0092790 A1 | 4/2014 | Zhang et al. |
| 2014/0126491 A1 | 5/2014 | Ekpenyong et al. |
| 2014/0226581 A1 | 8/2014 | Nam et al. |
| 2015/0016311 A1 | 1/2015 | Han et al. |
| 2015/0092624 A1 | 4/2015 | Yao et al. |
| 2015/0124670 A1 | 5/2015 | Park |

R-PDCCH, E-PDCCH, A-PDCCH

FIG. 15
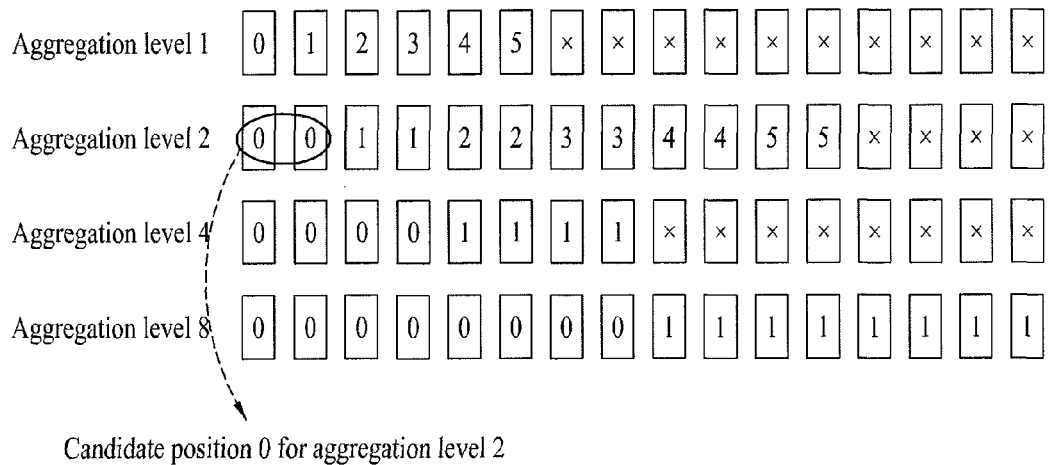
(a)
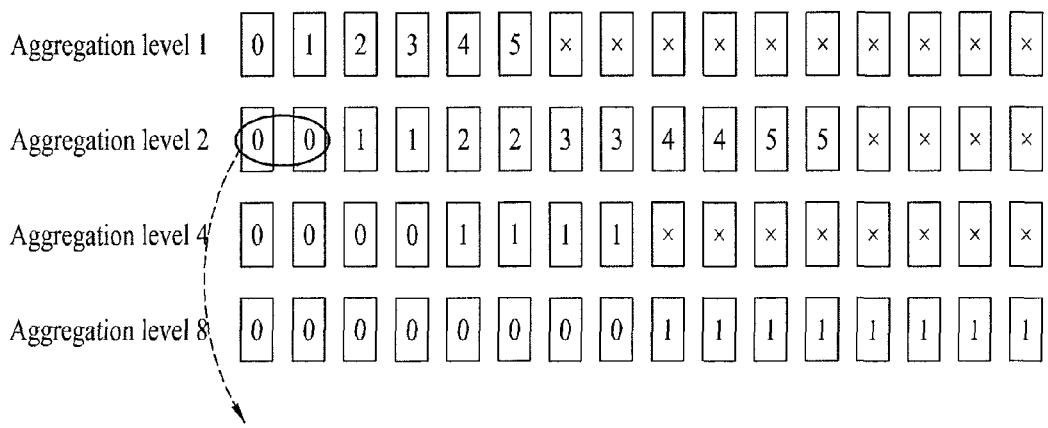
(b)

METHOD FOR TRANSMITTING UPLINK CONTROL INFORMATION, USER EQUIPMENT, METHOD FOR RECEIVING UPLINK CONTROL INFORMATION, AND BASE STATION

CROSS-REFERENCE TO RELATED APPLICATIONS

This Application is a Continuation of co-pending U.S. patent application Ser. No. 14/973,426 filed on Dec. 17, 2015, which is a Continuation of U.S. patent application Ser. No. 14/123,067 filed on Nov. 27, 2013 (now U.S. Pat. No. 9,246,656 issued on Jan. 26, 2016), which is filed as the National Phase of PCT/KR2012/004938 filed on Jun. 22, 2012, which claims the benefit under 35 U.S.C. §119(e) to U.S. Provisional Application Nos. 61/512,383 filed on Jul. 27, 2011 and 61/500,620 filed on Jun. 24, 2011, all of which are hereby expressly incorporated by reference into the present application.

BACKGROUND OF THE INVENTION

Field of the Invention

The present invention relates to a wireless communication system. Specifically, the present invention relates to a method and apparatus for transmitting an uplink signal and a method and apparatus for receiving an uplink signal.

Discussion of the Related Art

With appearance and spread of machine-to-machine (M2M) communication and a variety of devices such as smartphones and tablet PCs demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed. In addition, a communication environment has evolved into increasing density of nodes accessible by a user at the periphery of the nodes. A communication system including high-density nodes may provide a better communication service to the user by cooperation between the nodes.

SUMMARY OF THE INVENTION

Due to introduction of new radio communication technology, the number of user equipments (UEs) to which a BS should provide a service in a prescribed resource region increases and the amount of uplink data and uplink control information that the BS should receive from the UEs increases. Since the amount of resources available to the BS for communication with the UE(s) is finite, a new method in which the BS efficiently receives uplink data and/or uplink control information using the finite radio resources is needed.

Accordingly, the present invention provides a method and apparatus for efficiently transmitting/receiving an uplink signal.

The technical objects that can be achieved through the present invention are not limited to what has been particularly described hereinabove and other technical objects not described herein will be more clearly understood by persons skilled in the art from the following detailed description.

According to an aspect of the present invention, provided herein is a method for transmitting an uplink signal to a base station by a user equipment in a wireless communication system, including receiving first offset information indicating first physical uplink control channel (PUCCH) resources available for acknowledgement (ACK)/negative ACK (NACK) transmission associated with a first physical downlink control channel (PDCCH) from the base station; receiving the first PDCCH from the base station; and transmitting ACK/NACK information corresponding to the first PDCCH to the base station using a PUCCH resource determined from among the first PUCCH resources based on an index of a resource included in the first PDCCH and on the first offset information, wherein the first PDCCH is received in a data region of a downlink subframe and the first offset information is user equipment specific information.

In another aspect of the present invention, provided herein is a user equipment for transmitting an uplink signal to a base station in a wireless communication system, including a radio frequency (RF) unit; and a processor configured to control the RF unit, wherein the processor controls the RF unit to receive first offset information indicating first physical uplink control channel (PUCCH) resources available for acknowledgement (ACK)/negative ACK (NACK) transmission associated with a first physical downlink control channel (PDCCH) from the base station, controls the RF unit to receive the first PDCCH from the base station, and controls the RF unit to transmit ACK/NACK information corresponding to the first PDCCH to the base station using a PUCCH resource determined from among the first PUCCH resources based on an index of a resource included in the first PDCCH and on the first offset information, and wherein the first PDCCH is received in a data region of a downlink subframe and the first offset information is user equipment specific information.

In another aspect of the present invention, provided herein is a method for receiving an uplink signal from a user equipment by a base station in a wireless communication system, including transmitting first offset information indicating first physical uplink control channel (PUCCH) resources available for acknowledgement (ACK)/negative ACK (NACK) transmission associated with a first physical downlink control channel (PDCCH) to the user equipment; transmitting the first PDCCH to the user equipment; and receiving ACK/NACK information corresponding to the first PDCCH from the user equipment using a PUCCH resource determined from among the first PUCCH resources based on an index of a resource included in the first PDCCH and on the first offset information, wherein the first PDCCH is transmitted in a data region of a downlink subframe and the first offset information is user equipment specific information.

In another aspect of the present invention, provided herein is a base station for receiving an uplink signal from a user equipment in a wireless communication system, including a radio frequency (RF) unit; and a processor configured to control the RF unit, wherein the processor controls the RF unit to transmit first offset information indicating first physical uplink control channel (PUCCH) resources available for acknowledgement (ACK)/negative ACK (NACK) transmission associated with a first physical downlink control channel (PDCCH) to the user equipment, controls the RF unit to transmit the first PDCCH to the user equipment, and controls the RF unit to receive ACK/NACK information corresponding to the first PDCCH from the user equipment using a PUCCH resource determined from among the first PUCCH resources based on an index of a resource included in the first PDCCH and on the first offset information, and wherein the first PDCCH is transmitted in a data region of a downlink subframe and the first offset information is user equipment specific information.

In each aspect of the present invention, second offset information which is cell specific information indicating second PUCCH resources available for ACK/NACK transmission associated with a second PDCCH received in a control region of a downlink subframe may be transmitted from the base station to the user equipment. ACK/NACK information corresponding to the second PDCCH may be transmitted from the user equipment to the base station using a PUCCH resource determined from among the second PUCCH resources based on an index of a resource included in the second PDCCH and on the second offset information.

In each aspect of the present invention, scrambling identifier or antenna port information for the first PDCCH may be transmitted from the base station to the user equipment. The PUCCH resource used to transmit the ACK/NACK information corresponding to the first PDCCH may be determined based on the scrambling identifier or antenna port information.

In each aspect of the present invention, the first PDCCH may be received in a search space composed of a plurality of resource units, including a plurality of first PDCCH candidate positions according to aggregation levels. Each of the first PUCCH resources may be mapped to a candidate position having the lowest aggregation level among the first PDCCH candidate positions sharing one resource unit among the plurality of resource units in the search space.

The above technical solutions are merely some parts of the embodiments of the present invention and various embodiments into which the technical features of the present invention are incorporated can be derived and understood by persons skilled in the art from the following detailed description of the present invention.

According to the present invention, efficiency of uplink resource use is enhanced.

Effects according to the present invention are not limited to what has been particularly described hereinabove and other advantages not described herein will be more clearly understood by persons skilled in the art from the following detailed description of the present invention.

BRIEF DESCRIPTION OF THE DRAWINGS

The accompanying drawings, which are included to provide a further understanding of the invention, illustrate embodiments of the invention and together with the description serve to explain the principle of the invention.

FIG. 15 is a diagram explaining another embodiment of the present invention for allocating an ACK/NACK resource for an e-PDCCH.

DETAILED DESCRIPTION OF THE INVENTION

Figure 1:
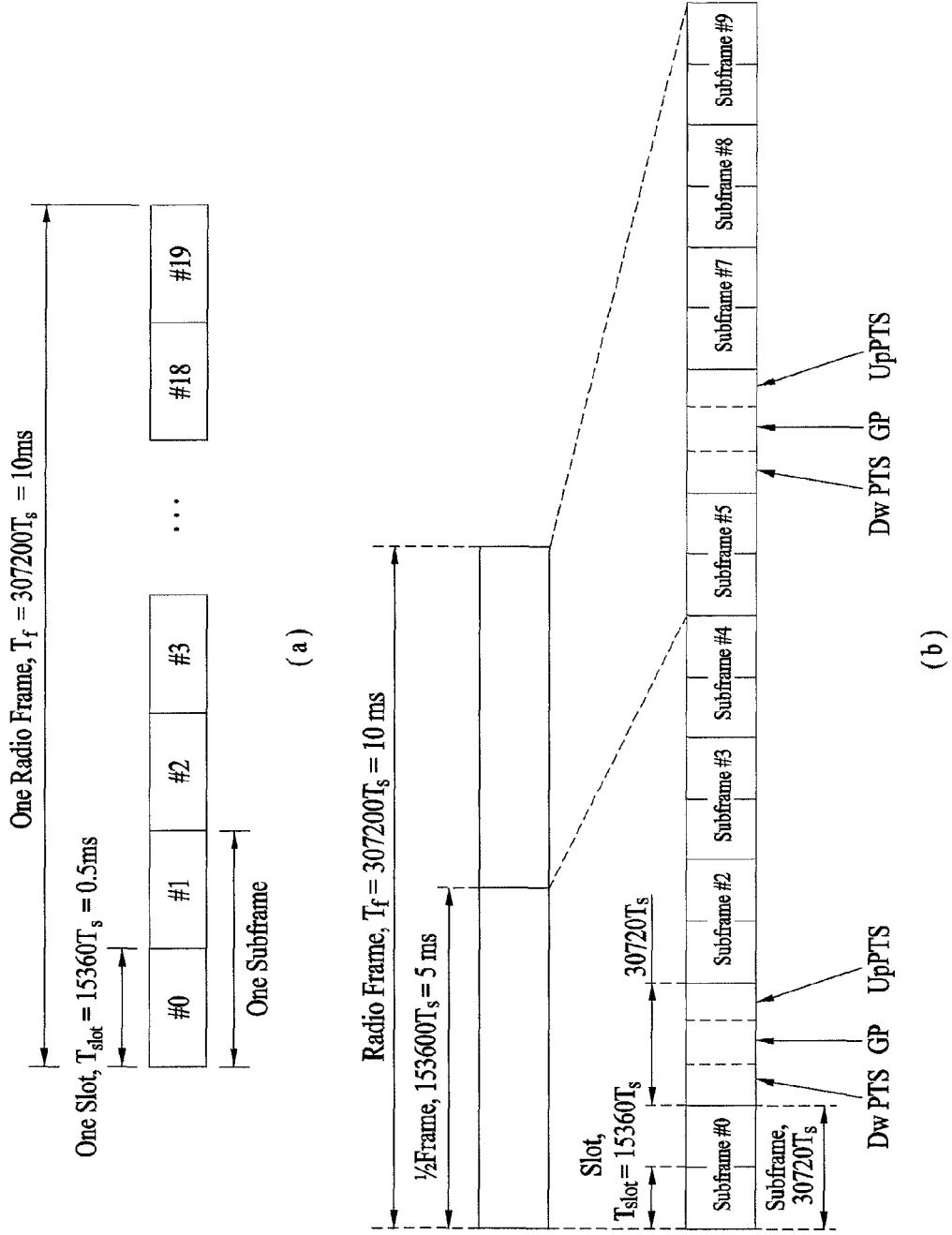
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Further, a technique, a device, and a system, which will be described hereinbelow, may be applied to various multiple access radio systems. For convenience, description will be given under the assumption that the present invention is applied to 3GPP LTE(-A). However, technical features of the present invention are not limited thereto. For example, although the following detailed description is given based on a 3GPP LTE(-A) mobile communication system, the present invention is applicable to other mobile communication systems except for matters that are specific to 3GPP LTE(-A).

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) denotes a fixed or mobile type terminal. Examples of the UE include various devices that transmit and receive user data and/or various kinds of control information to and from a base station. The UE may be referred to as a terminal equipment (TE), a mobile station (MS), a mobile terminal (MT), a user terminal (UT), a subscriber station (SS), a wireless device, a personal digital assistant (PDA), a wireless modem, or a handheld device. In addition, in the present invention, a base station (BS) means a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), or a processing server (PS).

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or Resource Elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PDSCH/PUCCH/PUSCH is referred to as PDCCH/PCFICH/PHICH/PDSCH/PUCCH/PUSCH RE or PDCCH/PCFICH/PHICH/PDSCH/PUCCH/PUSCH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of a BS is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which can be used in frequency division multiplexing (FDD) in 3GPP LTE(-A) and FIG. 1(b) illustrates an exemplary structure of a radio frame which can be used in time division multiplexing (TDD) in 3GPP LTE(-A).

Referring to FIG. 1, a 3GPP LTE(-A) radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL config-uration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| DL-UL config-uration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission.

Figure 2:
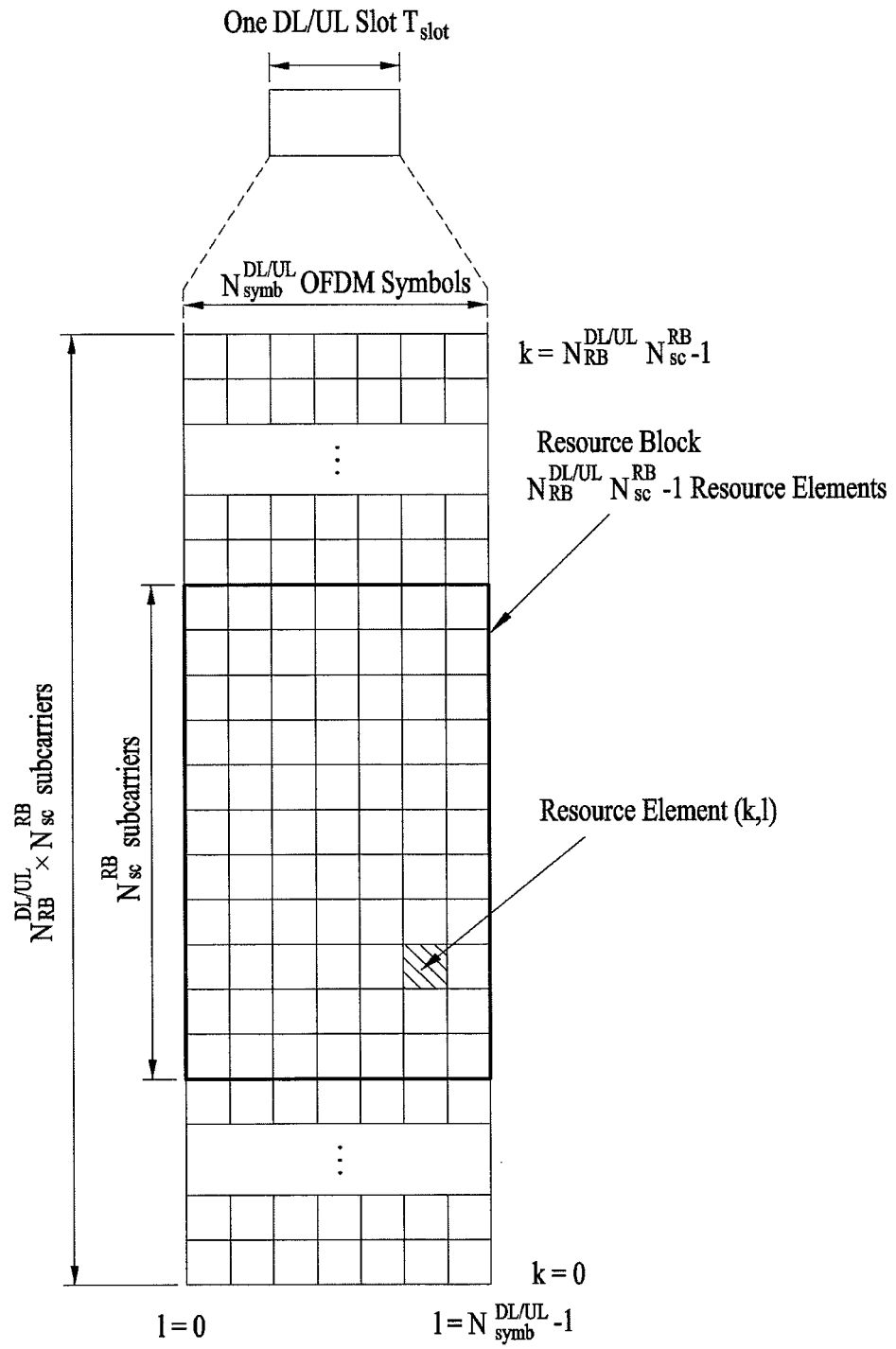
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid exists per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
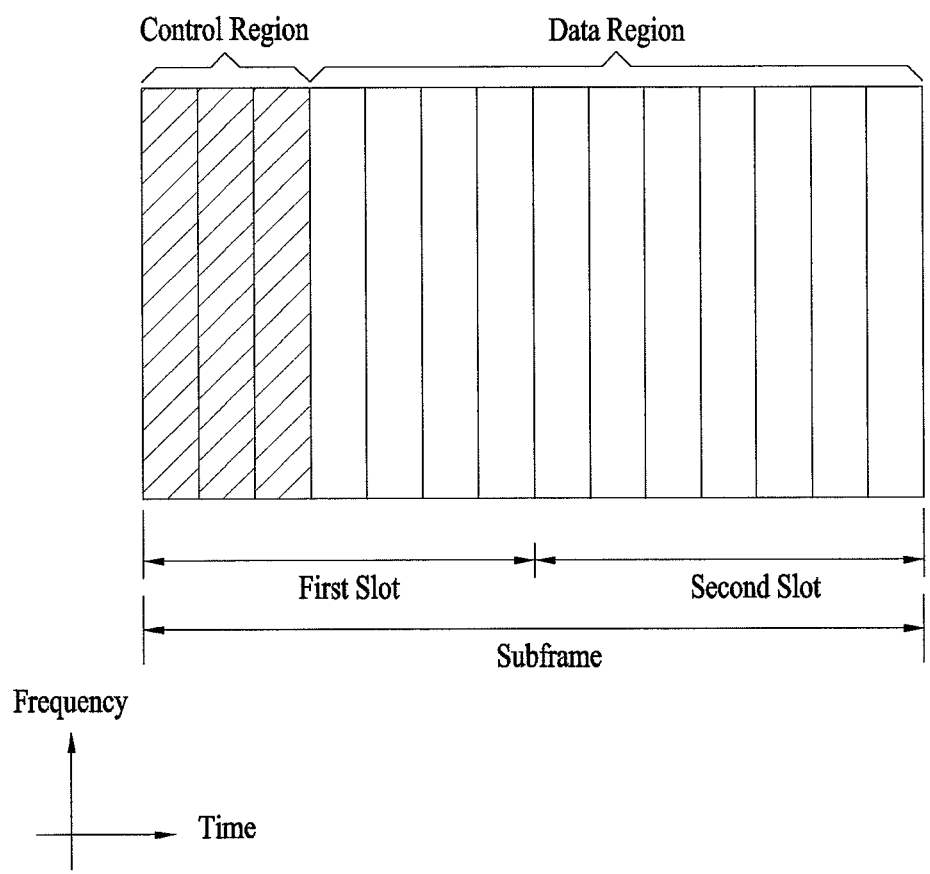
FIG. 3 illustrates the structure of a DL subframe used in a 3GPP LTE(-A) system.

FIG. 3 illustrates the structure of a DL subframe used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ ACK/NACK as a response to UL transmission.

Control transmitted via a PDCCH is referred to as downlink control information (DCI). The DCI includes resource allocation information for a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a transmission (Tx) power control command set for individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked (or scrambled) with an identifier (e.g. a radio network temporary identifier (RNTI)) according to an owner or usage of the PDCCH. If the PDCCH is for a specific UE, a cell-RNTI (C-RNTI) of the UE may be masked to the CRC. If the PDCCH is for a paging message, a paging identifier (e.g. paging-RNTI (P-RNTI)) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (i.e. a PCFICH and a PHICH). A DCI format and the number of DCI bits are determined according to the number of CCEs.

CCEs are numbered and consecutively used. In order to simplify a decoding process, a PDCCH having a format composed of n CCEs may start from only a CCE having a number corresponding to a multiple of n. The number of CCEs used to transmit a specific PDCCH, that is, a CCE aggregation level, is determined by a BS according to channel state. For example, in case of a PDCCH for a UE having a good DL channel (e.g. a UE adjacent to a BS), one CCE may be sufficient. However, in case of a PDCCH for a UE having a bad channel (e.g. a UE located at a cell edge), 8 CCEs are required to obtain sufficient robustness.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (i.e. a PCFICH and a PHICH). A DCI format and the number of DCI bits are determined according to the number of CCEs. For example, 4 DCI formats are supported as shown in Table 2.

TABLE 2

| DCI format | Number of CCEs (n) | Number of REGs | Number of DCI bits |
|---|---|---|---|
| 0 | 1 | 0 | 72 |
| 1 | 2 | 18 | 144 |
| 2 | 3 | 36 | 288 |
| 3 | 4 | 72 | 576 |

CCEs are numbered and consecutively used. In order to simplify a decoding process, a PDCCH having a format composed of n CCEs may start from only a CCE having a number corresponding to a multiple of n. The number of CCEs used to transmit a specific PDCCH, that is, a CCE aggregation level, is determined by a BS according to channel state. For example, in case of a PDCCH for a UE having a good DL channel (e.g. a UE adjacent to a BS), one CCE may be sufficient. However, in case of a PDCCH for a UE having a bad channel (e.g. a UE located at a cell edge), 8 CCEs are required to obtain sufficient robustness. Moreover, a power level of a PDCCH may be adjusted to suit a channel state.

In a 3GPP LTE system, a CCE set in which a PDCCH can be located for each UE is defined. A CCE set in which the UE can detect a PDCCH thereof is referred to as a PDCCH search space or simply as a search space (SS). An individual resource on which a PDCCH can be transmitted in a search space is referred to as a PDCCH candidate. A set of PDCCH candidates that are to be monitored by the UE is defined as a search space. One PDCCH candidate corresponds to 1, 2, 4, or 8 CCEs according to CCE aggregation levels. A BS transmits an actual PDCCH (DCI) on an PDCCH candidate in a search space and a UE monitors the search space to detect the PDCCH (DCI). Specifically, the UE attempts to perform blind-decoding upon PDCCH candidates in the search space.

In the 3GPP LTE system, SSs for respective PDCCH formats may have different sizes and a dedicated search space and a common search space are defined. The dedicated search space is a UE-specific search space and is configured for each individual UE. The common search space is configured for a plurality of UEs. Table 3 shows aggregation levels for defining SSs.

TABLE 3

| Search Space | | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A UE, which has detected a PDCCH thereof by monitoring a corresponding search space at each aggregation level, decodes a PDSCH in a PDSCH region of a DL subframe and/or transmits a PUSCH in a data region of a UL subframe based on DCI carried by the detected PDCCH.

Figure 4:
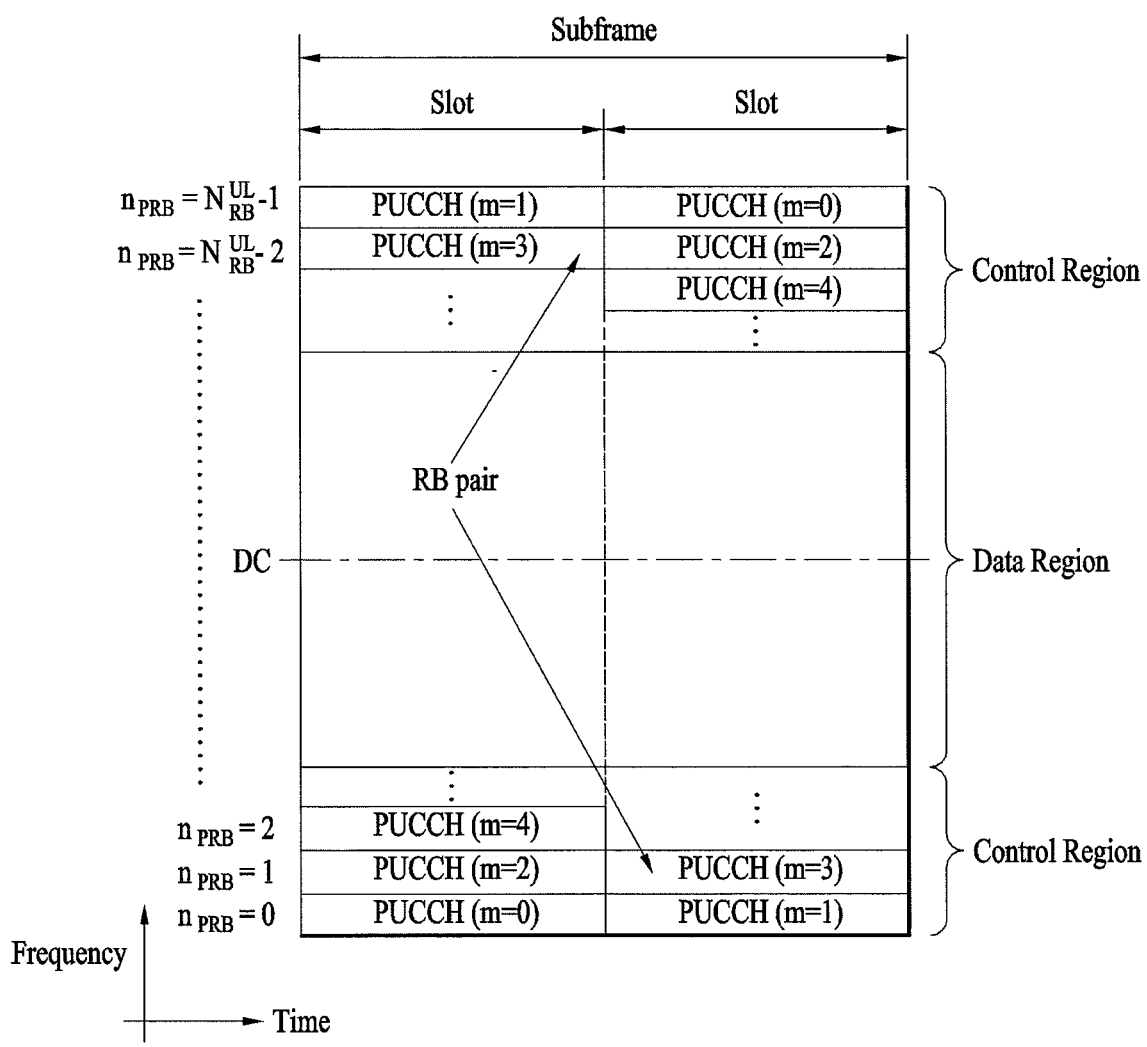
FIG. 4 illustrates the structure of a UL subframe used in a 3GPP LTE(-A) system.

FIG. 4 illustrates the structure of a UL subframe used in a 3GPP LTE(-A) system.

Referring to FIG. 4, a UL subframe may be divided into a data region and a control region in the frequency domain. One or several PUCCHs may be allocated to the control region to deliver UCI. One or several PUSCHs may be allocated to the data region of the UL subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted on a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of a PUCCH and a PUSCH may be indicated by higher layers.

In the UL subframe, subcarriers distant from a direct current (DC) subcarrier are used as the control region. In other words, subcarriers located at both ends of a UL transmission bandwidth are used to transmit UL control information. A DC subcarrier is a component unused for signal transmission and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The PUCCH allocated as above will be expressed as that the pair of RBs allocated to the PUCCH is subjected to frequency hopping at the slot boundary. However, if frequency hopping is not applied to the RB pair, the RBs forming the RB pair occupy the same subcarriers at the two slots.

The size and usage of UCI carried by one PUCCH may be changed according to PUCCH format and the size of the UCI may be changed according to coding rate. For example, the following PUCCH format may be defined.

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codewords |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are mainly used to transmit ACK/NACK information and PUCCH format 2 series is mainly used to carry channel state information (CSI) such as channel quality indicator (CQI)/precoding matrix indicator (PMI)/rank indicator (RI).

A UE is assigned PUCCH resources for UCI transmission by a BS through a higher layer signal, a dynamic control signal, or an implicit scheme. Physical resources used for a PUCCH depend on two parameters, $N^{(2)}_{RB}$ and $N^{(1)}_{CS}$, given by higher layers. The parameter $N^{(2)}_{RB}$, which is equal to or greater than 0 ($N^{(2)}_{RB} \geq 0$), indicates available bandwidth for PUCCH format 2/2a/2b transmission at each slot and is expressed as an integer multiple of $N^{RB}_{sc}$. The parameter $N^{(1)}_{CS}$ indicates the number of cyclic shifts used for PUCCH format 1/1a/1b in an RB used for a mix of formats 1/1a/1b and 2/2a/2b. A value of $N^{(1)}_{CS}$ is an integer multiple of $\Delta^{PUCCH}_{shift}$ within a range of $\{0, 1, \ldots, 7\}$. $\Delta^{PUCCH}_{shift}$ is provided by higher layers. If $N^{(1)}_{CS}$ is 0, no mixed RB id present. At each slot, at most one RB supports a mix of PUCCH format 1/1a/1b and PUCCH format 2/2a/2b. Resources used for transmission of PUCCH format 1/1a/1b, PUCCH format 2/2a/2b, and PUCCH format 3 by an antenna port p are expressed by $n^{(1,\tilde{p})}_{PUCCH}$, $n^{(2,\tilde{p})}_{PUCCH} < N^{(2)}_{RB} \cdot N^{RB}_{sc} + \text{ceil}(N^{(1)}_{cs}/8) \cdot (N^{RB}_{sc} - N^{(1)}_{cs} - 2)$, and $n^{(3,\tilde{p})}_{PUCCH}$, respectively, which are indexes of non-negative integers.

More specifically, an orthogonal sequence and/or a cyclic shift to be applied to UCI are determined from PUCCH resource indexes according to a specific rule predefined for each PUCCH format, and resource indexes of two RBs in a subframe, to which a PUCCH is to be mapped, are provided. For example, a PRB for PUCCH transmission in a slot $n_s$ is given as follows.

$$n_{PRB} = \begin{cases} \left\lfloor \frac{m}{2} \right\rfloor & \text{if } (m + n_s \bmod 2) \bmod 2 = 0 \\ N^{UL}_{RB} - 1 - \left\lfloor \frac{m}{2} \right\rfloor & \text{if } (m + n_s \bmod 2) \bmod 2 = 1 \end{cases} \quad \text{Equation 1}$$

In Equation 1, m depends on a PUCCH format and is given as Equation 2, Equation 3, and Equation 4 for PUCCH format 1/1a/1b, PUCCH format 2/2a/2b, and PUCCH format 3, respectively.

$$m = \begin{cases} N^{(2)}_{RB} & \text{if } n^{(1,\tilde{p})}_{PUCCH} < c \cdot \\ & \quad N^{(1)}_{cs}/\Delta^{PUCCH}_{shift} \\ \left\lfloor \frac{n^{(1,\tilde{p})}_{PUCCH} - c \cdot N^{(1)}_{cs}/\Delta^{PUCCH}_{shift}}{c \cdot N^{RB}_{sc}/\Delta^{PUCCH}_{shift}} \right\rfloor + \\ \quad N^{(2)}_{RB} + \left\lceil \frac{N^{(1)}_{cs}}{8} \right\rceil & \text{otherwise} \end{cases} \quad \text{Equation 2}$$

$$c = \begin{cases} 3 & \text{normal cyclic prefix} \\ 2 & \text{extended cyclic prefix} \end{cases}$$

In Equation 2, $n^{(1,\tilde{p})}_{PUCCH}$ denotes a PUCCH resource index of an antenna port p for PUCCH format 1/1a/1b. In the case of an ACK/NACK PUCCH, $n^{(1,\tilde{p})}_{PUCCH}$ is a value implicitly determined by the first CCE index of a PDCCH carrying scheduling information of a corresponding PDSCH.

$$m = \lfloor n^{(2,\tilde{p})}_{PUCCH}/N^{RB}_{sc} \rfloor \quad \text{Equation 3}$$

where $n^{(2)}_{PUCCH}$ denotes a PUCCH resource index of an antenna port p for PUCCH format 2/2a/2b and is a value transmitted to a UE from a BS through higher layer signaling.

$$m = \lfloor n^{(3,\tilde{p})}_{PUCCH}/N^{PUCCH}_{SF,0} \rfloor \quad \text{Equation 4}$$

$n^{(3)}_{PUCCH}$ denotes a PUCCH resource index of an antenna port p for PUCCH format 3 and is a value transmitted to a UE from a BS through higher layer signaling. $N^{PUCCH}_{SF,0}$ indicates a spreading factor for the first slot of a subframe. For all of two slots of a subframe using normal PUCCH format 3, $N^{PUCCH}_{SF,0}$ is 5. For first and second slots of a subframe using a reduced PUCCH format 3, $N^{PUCCH}_{SF,0}$ is 5 and 4, respectively.

Referring to Equation 2, a PUCCH resource for ACK/NACK is not pre-allocated to each UE and a plurality of UEs in a cell shares a plurality of PUCCH resources at every time. More specifically, a PUCCH resource used by the UE to transmit ACK/NACK is dynamically determined based on a PDCCH which carries scheduling information for a PDSCH carrying DL data. An entire region in which the PDCCH is transmitted in each DL subframe includes a plurality of CCEs and the PDCCH transmitted to the UE includes one more CCEs. The UE transmits ACK/NACK through a PUCCH resource linked to a specific CCE (e.g. the first CCE) among CCEs constituting the PDCCH received thereby. Hereinafter, the PUCCH resource, which is dynamically determined in association with the PDCCH, for ACK/NACK transmission is particularly referred to as an ACK/NACK PUCCH resource.

Figure 5:
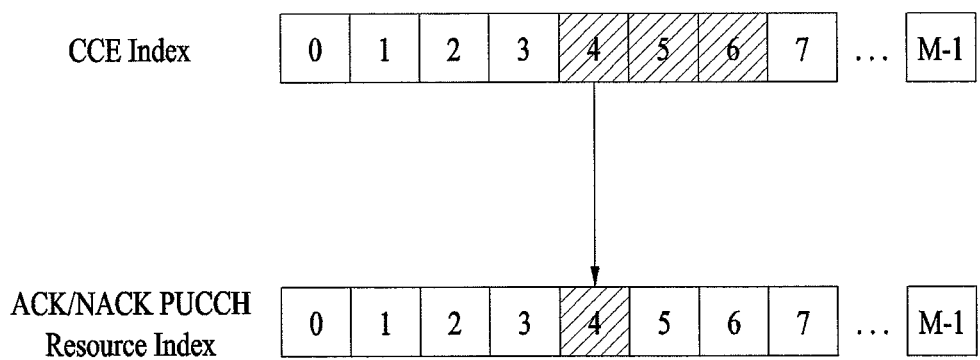
FIG. 5 illustrates an example for determining a PUCCH resource for ACK/NACK in a 3GPP LTE(-A) system.

FIG. 5 illustrates an example for determining a PUCCH resource for ACK/NACK in a 3GPP LTE(-A) system. Particularly, FIG. 5 illustrates the case in which a maximum of M CCEs is present in DL and a maximum of M PUCCH resources are reserved.

Referring to FIG. 5, each PUCCH resource index corresponds to each PUCCH resource for ACK/NACK transmission. As illustrated in FIG. 5, on the assumption that scheduling information for a PDSCH is transmitted to a UE through a PDCCH including CCE indexes 4, 5 and 6 and CCE index 4 is linked to PUCCH resource index 4, the UE transmits ACK/NACK information to a BS on PUCCH resource index 4 corresponding to CCE index 4 configuring the PDCCH. Specifically, in the 3GPP LTE(-A) system, a PUCCH resource index for transmission by two antenna ports $p_0$ and $p_1$ is determined as follows.

$$n_{PUCCH}^{(1,\tilde{p}=p0)} = n_{CCE} + N_{PUCCH}^{(1)} \quad \text{Equation 5}$$

$$n_{PUCCH}^{(1,\tilde{p}=p1)} = n_{CCE} + 1 + N_{PUCCH}^{(1)} \quad \text{Equation 6}$$

Here, $n^{(1,\tilde{p}=p0)}_{PUCCH}$ denotes an ACK/NACK PUCCH resource index (i.e. number) to be used by antenna port $p_0$, $n^{(1,\tilde{p}=p1)}_{PUCCH}$ denotes an ACK/NACK PUCCH resource index to be used by antenna port $p_1$, and $N^{(1)}_{PUCCH}$ denotes a signaling value received from higher layers. $n_{CCE}$ is the lowest of CCE indexes used for PDCCH transmission. For example, if a CCE aggregation level is 2 or more, the first CCE index among a plurality of CCE indexes aggregated for PDCCH transmission is used to determine an ACK/NACK PUCCH resource.

Hereinafter, RB mapping will be described. A physical resource block (PRB) and a virtual resource block (VRB) are defined. The PRB is identical to the RB shown in FIG. 2. That is, the PRB is defined as $N^{DL}_{symb}$ consecutive OFDM symbols in the time domain and $N^{RB}_{sc}$ consecutive subcarriers in the frequency domain. The PRB is numbered from 0 to $N^{DL}_{RB} - 1$ in the frequency domain. The relationship between a PRB number $n_{PRB}$ and an RE (k,l) in a slot is as follows.

$$n_{PRB} = \left\lfloor \frac{k}{N^{RB}_{sc}} \right\rfloor \quad \text{Equation 7}$$

The VRB is a sort of logical resource allocation unit introduced for resource allocation. The VRB is equal in size to the PRB. The VRB is classified into a localized VRB (LVRB) and a distributed VRB (DVRB). Regardless of VRB type, a pair of RBs is allocated over two slots of a subframe by a single VRB number $n_{VRB}$. Two PRBs, which are respectively located in two slots of a subframe and have the same VRB number, are referred to as a VRB pair.

Figure 6:
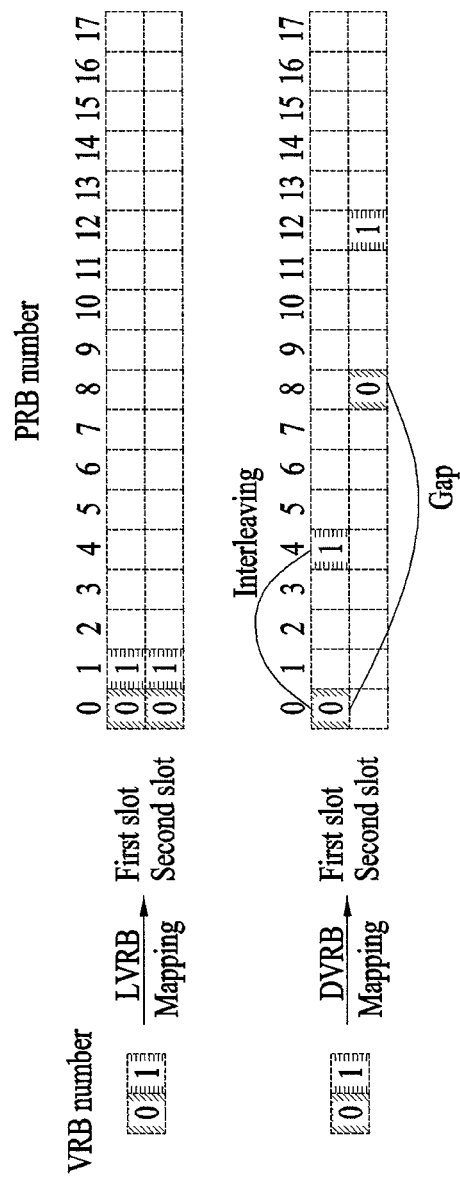
FIG. 6 illustrates a method of mapping a virtual resource block to a physical resource block.

FIG. 6 illustrates a method of mapping a VRB to a PRB.

Referring to FIG. 6, LVRBs are directly mapped to PRBs so that VRB numbers (or VRB indexes) correspond equally to PRB numbers. That is, $n_{PRB}=n_{VRB}$. The LVRBs are numbered from 0 to $N^{DL}_{VRB}-1$ and $N^{DL}_{VRB}=N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first slot and the second slot. Specifically, the DVRB may be mapped to the PRBs as indicated in Table 5. Table 5 illustrates RB gap values.

TABLE 5

| System BW ($N_{RB}^{DL}$) | Gap ($N_{gap}$) | |
|---|---|---|
| | 1st Gap ($N_{gap,1}$) | 2nd Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g. PRB unit) when VRBs of the same number are mapped to PRBs of the first slot and the second slot. For $6 \leq N_{RB}^{DL} \leq 49$, only one gap is defined ($N_{gap}=N_{gap,1}$). For $50 \leq N_{RB}^{DL} \leq 110$, two gap values $N_{gap,1}$ and $N_{gap,2}$ are defined. $N_{gap}=N_{gap,1}$ or $N_{gap}=N_{gap,2}$ is signaled through DL scheduling. DVRBs are numbered from 0 to $N^{DL}_{VRB}-1$. For $N_{gap}=N_{gap,1}$, $N^{DL}_{VRB}=N^{DL}_{VRB,gap1}=2 \cdot \min(N_{gap}, N^{DL}_{RB}-N_{gap})$. For $N_{gap}=N_{gap,2}$, $N^{DL}_{VRB}=N^{DL}_{VRB,gap2}=\text{floor}(N^{DL}_{RB}/2 \cdot N_{gap}) \cdot 2 \cdot N_{gap}$. min(A, B) indicates the smaller of A or B and floor(x) indicates the largest integer not greater than x.

Successive $\tilde{N}^{DL}_{VRB}$ VRB numbers configure a unit for interleaving VRBs. If $N_{gap}=N_{gap,1}$, then $\tilde{N}_{VRB}^{DL}=N^{DL}_{VRB}$ and if $N_{gap}=N_{gap,2}$, then $\tilde{N}_{VRB}^{DL}=2N_{gap}$. VRB number interleaving of each interleaving unit may be performed using four columns and $N_{row}$ rows. $N_{row}=\lceil \tilde{N}_{VRB}^{DL}/(4P) \rceil \cdot P$ and P is the size of a resource block group (RBG). The RBG is defined as P successive RBs. A VRB number is written in a matrix on a row-by-row basis and is read on a column-by-column basis. $N_{null}$ null values are inserted into the last $N_{null}/2$ rows of the second and fourth columns and $N_{null}=4N_{row}-\tilde{N}_{VRB}^{DL}$. The null value is ignored when reading out.

Figure 7:
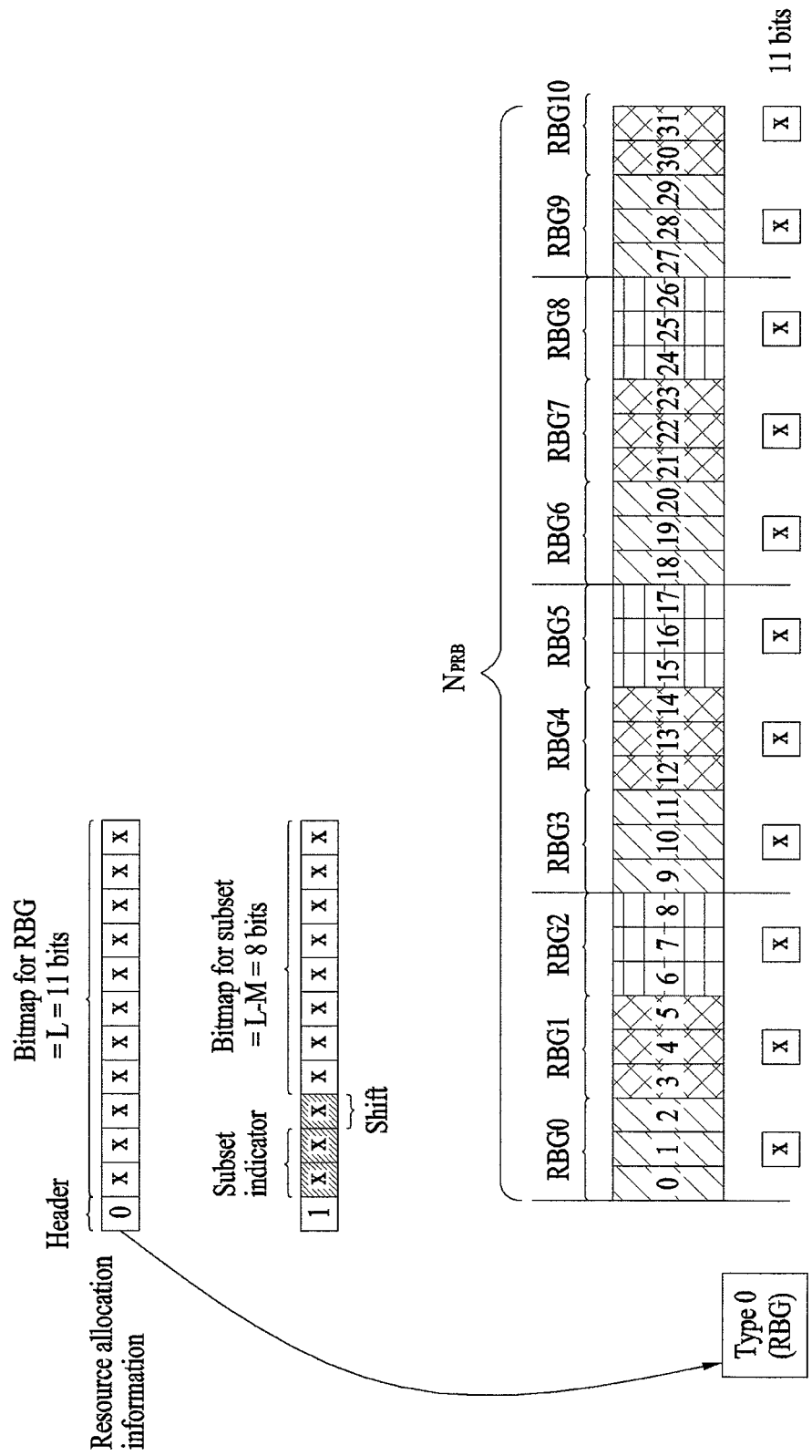
FIGS. 7, 8 and 9 illustrate control information formats for Type 0 resource allocation (RA), Type 1 RA, and Type 2 RA and examples of resource allocation thereof, respectively.
Figure 8:
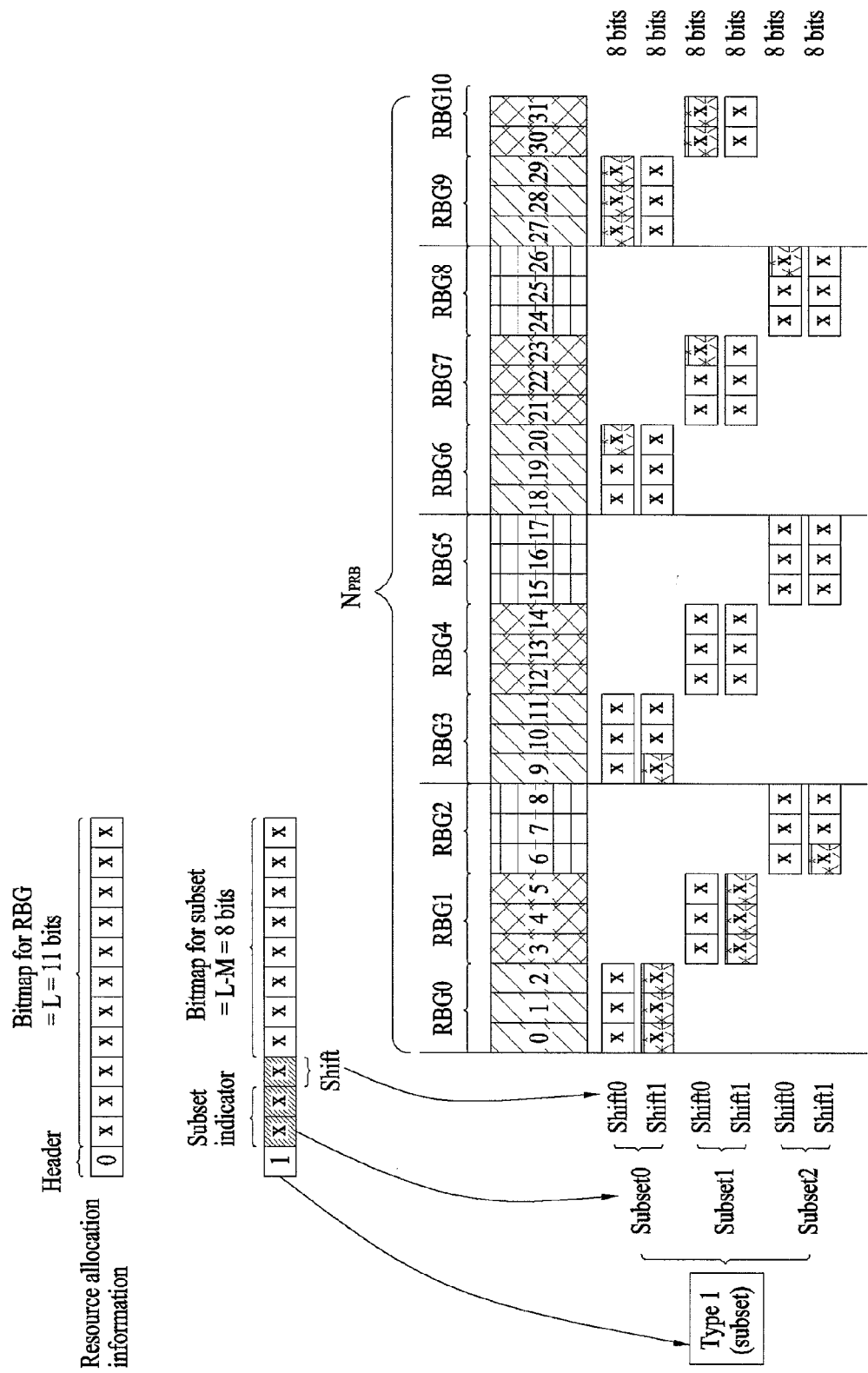
Figure 9:
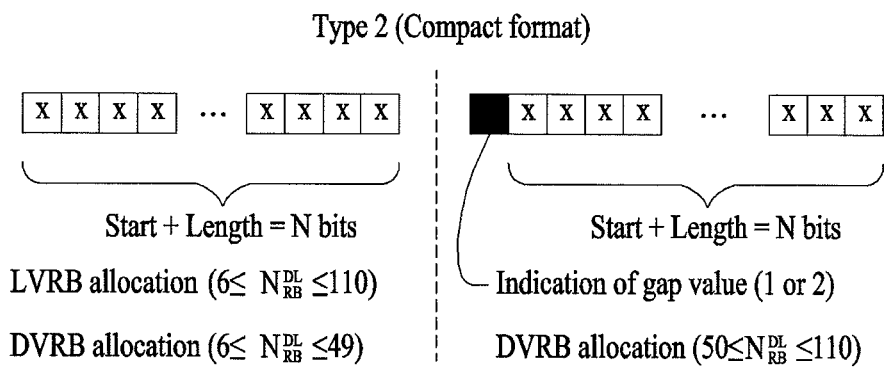

Hereinafter, resource allocation defined in legacy LTE will be described. FIGS. 7, 8, and 9 illustrate control information formats for Type 0 resource allocation (RA), Type 1 RA, and Type 2 RA and examples of resource allocation thereof, respectively.

A UE interprets a resource allocation field based on a detected PDCCH DCI format. The resource allocation field in each PDCCH includes two parts: a resource allocation header field and actual resource block allocation information. PDCCH DCI formats 1, 2, and 2A for Type 0 and Type 1 RA have the same format and are distinguished by a single-bit resource allocation header field according to DL system bandwidth. Specifically, Type 0 RA is indicated by 0 and Type 1 RA is indicated by 1. While PDCCH DCI formats 1, 2, and 2A are used for Type 0 or Type 1 RA, PDCCH formats 1A, 1B, 1C, and 1D are used for Type 2 RA. A PDCCH DCI format having Type 2 RA does not include a resource allocation header field. The resource allocation field indicates a PRB set of the first slot. Since slot hopping does not exist between the first slot and the second slot in the case of RA Type 0, Type 1, and Type 2-LVRB, which will be described later, the same PRB set as in the first slot is allocated in the second slot (i.e. PRB index (of the first slot)=PRB index (of the second slot)). Meanwhile, in the case of RA Type 2-DVRB, if the PRB set of the first slot is given, the PRB set of the second slot is determined by a slot hopping rule.

Referring to FIG. 7, in Type 0 RA, resource block allocation information includes a bitmap indicating an RBG allocated to a UE. The RBG is a set of consecutive PRBs. The size P of the RBG depends upon system bandwidth as shown in Table 6.

TABLE 6

| System Bandwidth $N^{DL}_{RB}$ | RBG size (P) |
|---|---|
| ≤10 | 1 |
| 11-26 | 2 |
| 27-63 | 3 |
| 64-110 | 4 |

In DL system bandwidth having $N^{DL}_{RB}$ PRBs, a total number of PRGs is given by $N_{RBG}=\text{ceil}(N^{DL}_{RB}/P)$, the size of $\text{floor}(N^{DL}_{RB}/P)$ RBGs is P, and the size of one RBG is $N^{DL}_{RB}-P \cdot \text{floor}(N^{DL}_{RB}/P)$ in the case of $N^{DL}_{RB}$ mod P>0. ceil(x) indicates a minimum integer not smaller than x and mod indicates a modulo operation. The size of a bitmp is $N_{RBG}$ and each bit corresponds to one RBG. All RBGs are indexed 0 to $N_{RBG}-1$ in a frequency increase direction and RBG 0 to RBG $N_{RBG}-1$ are mapped from a most significant bit (MSB) to a least significant bit (LSB) of the bitmap.

Referring to FIG. 8, in Type 1 RA, resource block allocation information having the size of $N_{RBG}$ informs a scheduled UE of resources in an RBG subset in PRB units. The RBG subset p (0≤p<P) includes every P-th RBG starting from an RBG p. The resource block allocation information includes three fields. A first field has ceil{$\log_2$(P)} bits and indicates an RBG subset selected from among P RBG subsets. A second field has one bit and indicates shift of a resource allocation span within a subset. The shift is triggered if a bit value is 1 and is not triggered if a bit value is 0. A third field includes a bitmap and each bit indicates one PRB within a selected RBG set. The size of a bitmap part used to indicate a PRB within the selected RBG subset is $N^{TYPE1}_{RB}$ and is defined as follows.

$$N_{RB}^{TYPE1}=\lceil N_{RB}^{DL}/P \rceil - \lceil \log_2(P) \rceil - 1 \qquad \text{Equation 8}$$

An addressable PRB number in the selected RBG subset may start from an offset $\Delta_{shift}(p)$ from the smallest PRB number within the selected RBG subset and may be mapped to the MSB of a bitmap. The offset is represented by the number of PRBs and is applied within the selected RBG subset. If the bit value within a second field for shift of a resource allocation span is set to 0, an offset for an RBG subset p is $\Delta_{shift}(p)=0$. In the other cases, an offset for an RBG subset p is given by $\Delta_{shift}(p)=N^{RBGsubset}_{RB}(p)-$ $N^{TYPE1}{}_{RB}$. $N^{RBGsubset}{}_{RB}(p)$ denotes the number of PRBs within the RBG subset p and may be obtained as follows.

$$N_{RB}^{RBGsubset}(p) = \quad \text{Equation 9}$$

$$\begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1) \bmod P + 1, & p = \left\lfloor \frac{N_{RB}^{DL}-1}{P} \right\rfloor \bmod P \\ \left\lfloor \frac{N_{RB}^{DL}-1}{P^2} \right\rfloor \cdot P, & p > \left\lfloor \frac{N_{RB}^{DL}-1}{P} \right\rfloor \bmod P \end{cases}$$

Referring to FIG. 9, in Type 2 RA, resource block allocation information indicates a set of LVRBs or DVRBs consecutively allocated to a scheduled UE. If resource allocation is signaled in PDCCH DCI format 1A, 1B, or 1D, a 1-bit flag indicates whether an LVRB or DVRB is allocated (e.g. 0 denotes LVRB allocation and 1 denotes DVRB allocation). In contrast, if resource allocation is signaled in PDCCH DCI format 1C, only DVRB is always allocated. A Type 2 RA field includes a resource indication value (RIV) and the RIV corresponds to a start resource block $RB_{start}$ and length. The length denotes the number of virtually and consecutively allocated RBs.

Figure 10:
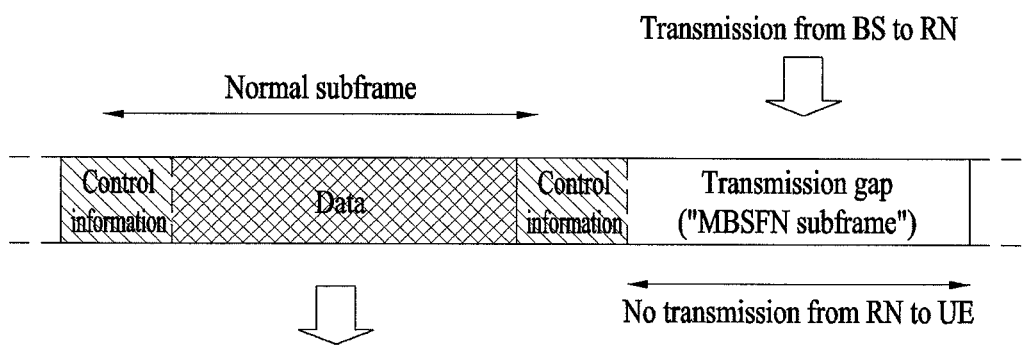
FIG. 10 illustrates an example in which a BS transmits signals to an RN using a specific subframe.

FIG. 10 illustrates an example in which a BS transmits signals to an RN using a specific subframe.

A relay (RN) refers to a device and/or a point for extending a service area of a BS or smoothly providing a service of a BS by being installed in a shadow area. The RN may be referred to by other terms such as a relay node (RN) and relay station (RS). In terms of a UE, the RN is a portion of a radio access network and operates like a BS except in some cases. A BS that transmits signals to the RN or receives signals from the RN is called a donor BS. The RN is connected to the donor BS wirelessly. In terms of the BS, the RN operates like the UE except in some cases (e.g. the case in which DL control information is transmitted through a relay PDCCH (R-PDCCH), not through a PDCCH). Accordingly, the RN includes both a physical layer entity used for communication with the UE and a physical layer entity used for communication with the donor BS. Transmission from the BS to the RN, hereinafter referred to as BS-to-RN transmission, occurs in a DL subframe and transmission from the RN to the BS, hereinafter referred to as RN-to-BS transmission, occurs in a UL subframe. Meanwhile, BS-to-RN transmission and RN-to-UE transmission occur in a DL frequency band and RN-to-BS transmission and UE-to-RN transmission occur in a UL frequency band. In the present invention, the RN or UE may communicate with a network to which one or more BSs belong through one or more BSs. Especially, FIG. 10 illustrates communication from the RN to the UE, using a normal subframe, and communication from the BS to the RN, using a multimedia broadcast single frequency network (MBSFN) subframe.

In an in-band relay mode in which a BS-RN link (i.e. backhaul link) and an RN-UE link (i.e. RN access link) operate in the same frequency band, if the RN transmits a signal to the UE while receiving a signal from the BS or vice versa, a transmitter and a receiver of the RN cause interference. In order to solve the interference problem, the RN may be configured not to perform communication with UEs while receiving data from the BS. The time duration during which UEs do not expect any RN transmission, i.e. a transmission gap, may be generated by configuring an MBSFN subframe. That is, the RN or BS may configure a subframe as the MBSFN subframe and establish a backhaul link in the MBSFN subframe (a fake MBSFN method). If it is signaled the a subframe is the MBSFN subframe, the UE detects a DL signal only in a PDCCH region of the corresponding subframe and thus the RN may configure the backhaul link using a PDSCH region of the corresponding subframe. The RN may receive a signal from the BS in a specific subframe (e.g. MBSFN subframe) and transmit data received from the BS to the UE in another subframe.

According to 3GPP TS 36.216 regarding RN operation, in the BS-RN link (backhaul), an R-PDCCH carries DCI. That is, the R-PDCCH carriers DCI for RNs. Unlike a normal 3GPP LTE PDCCH, the R-PDCCH is transmitted/received in a PDSCH region and a DL R-PDCCH (i.e. R-PDCCH carrying DL grant) is transmitted/received in the first slot and a UL R-PDCCH (i.e. R-PDCCH carrying UL grant) is transmitted/received in the second slot.

Figure 11:
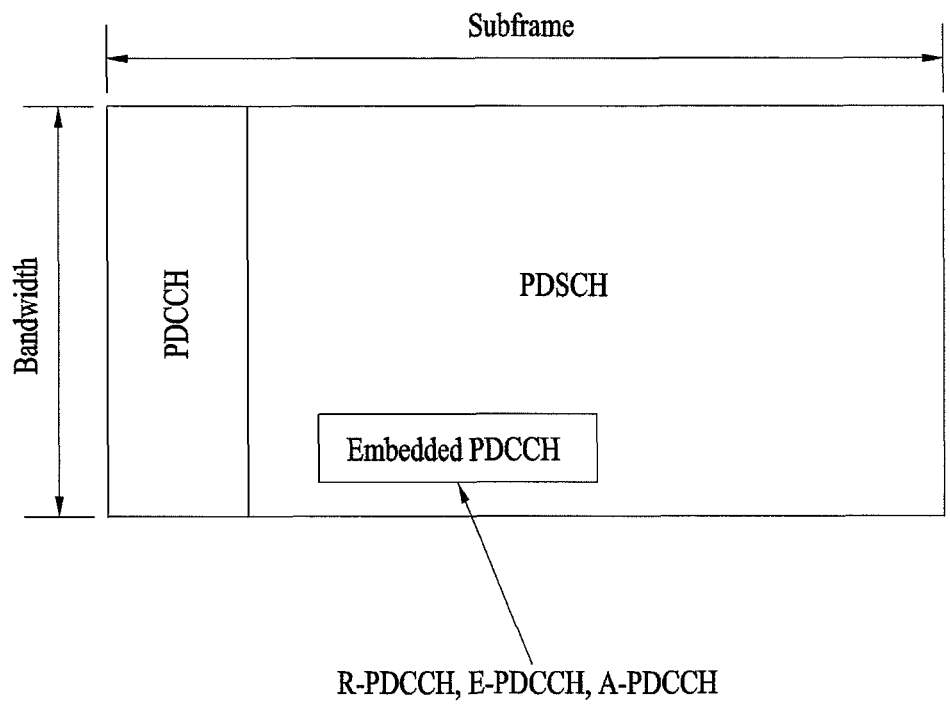
FIG. 11 is a diagram explaining the concept of an embedded PDCCH (e-PDCCH).

FIG. 11 is a diagram explaining the concept of an embedded PDCCH (e-PDCCH).

To improve system performance, introduction of a remote radio head (RRH) has been discussed. Also, since a plurality of serving component carriers (CCs) may be configured for one UE under carrier aggregation, a method for transmitting UL/DL grant for other CCs on a serving CC having good channel status has been discussed. If a CC carrying the UL/DL grant, which is scheduling information, is different from a CC on which UL/DL transmission corresponding to the UL/DL grants is performed, this is referred to as cross-carrier scheduling. If RRH technology and cross-carrier scheduling technology are introduced, the amount of PDCCHs that the BS should transmit is increased. However, since the size of a control region to which the PDCCH may be transmitted is the same as that of the conventional art, PDCCH transmission acts as a system performance bottleneck. Accordingly, in order to prevent PDCCH transmission from restricting system performance, PDCCH transmission using a PDSCH region of a DL subframe has been discussed. Referring to FIG. 11, a PDCCH based on the existing 3GPP LTE standard may be allocated to a PDCCH region of a DL subframe and the PDCCH may be additionally or separately allocated using some resources of a PDSCH region. While the existing PDCCH transmitted in the PDCCH region is transmitted using resources over a wide frequency band in the frequency domain, the PDCCH transmitted in the PDSCH region is usually transmitted using only a narrow frequency band. Hereinafter, for distinction with the existing PDCCH transmitted in front OFDM symbol(s) of the DL subframe, the PDCCH which is transmitted in rear OFDM symbols (PDSCH region) of the DL subframe will be referred to as an embedded PDCCH (e-PDCCH). The e-PDCCH is also called an enhanced PDCCH (E-PDCCH) or an advanced PDCCH (A-PDCCH). An R-PDCCH is a type of the e-PDCCH. A PDSCH/PUSCH scheduled by the e-PDCCH may be referred to as an e-PDSCH/e-PUSCH.

In an RN system according to 3GPP TS 36.216, a PUCCH resource, used for transmission of a PUCCH carrying information indicating whether PDSCH transmission is successful, (an ACK/NACK or scheduling request (SR) resource determined by a cyclic shift (CS) and an orthogonal cover sequence (OC)) is configured by a higher layer signal (e.g. RRC signal). If the PUCCH resource is configured by the RRC signal, it is difficult to frequently change resource configuration. Therefore, in a wireless communication system including the RN system in which the PUCCH resource is configured by the higher layer signal, it is difficult to efficiently allocate the PUCCH resource. To solve such a problem, dynamic allocation of the PUCCH resource, wherein the PUCCH resource is implicitly determined by linkage with a CCE index of a PDCCH, may be considered. However, a PDCCH resource carrying an e-PDCCH including an R-PDCCH is allocated using an index different from a CCE index applied to a normal PDCCH. That is, the PDCCH and e-PDCCH are managed by different CCE indexes. For example, we assume that a CCE associated with the PDCCH is referred to as a PDCCH CCE, a CCE associated with the e-PDCCH is referred to as an e-PDCCH CCE, and REs available for e-PDCCH transmission in a PDSCH region are grouped in the unit of CCEs to be sequentially assigned CCE indexes. If a CCE index of an e-PDCCH detected by a UE in a PDSCH region is 2, the UE should transmit ACK/NACK for the e-PDCCH or a PDSCH corresponding to the e-PDCCH, using a PUCCH resource connected to the CCE index 2. However, since the CCE index 2 is only one of local CCE indexes assigned to e-PDCCH CCEs available for e-PDCCH transmission, the UE cannot know to which index the CCE index 2 corresponds among common CCE indexes assigned to PDCCH CCEs available for PDCCH transmission and to e-PDCCH CCEs available for e-PDCCH transmission in a specific cell. As a result, the UE cannot surely know to which PRB a corresponding e-PDCCH CCE is mapped. That is, even if a PDCCH and an e-PDCCH are transmitted on a CCE having the same CCE index, since a CCE of the PDCCH and a CCE of the e-PDCCH indicate different CCEs, dynamic allocation of the PUCCH resource using an e-PDCCH resource has a difficulty in integrating into an existing rule of connecting a CCE index of the PDCCH to an ACK/NACK resource. Hereinafter, an embodiment of the present invention capable of overcoming the above problem by dynamically allocating the ACK/NACK resource using the e-PDCCH will be described with reference to FIG. 12.

Figure 12:
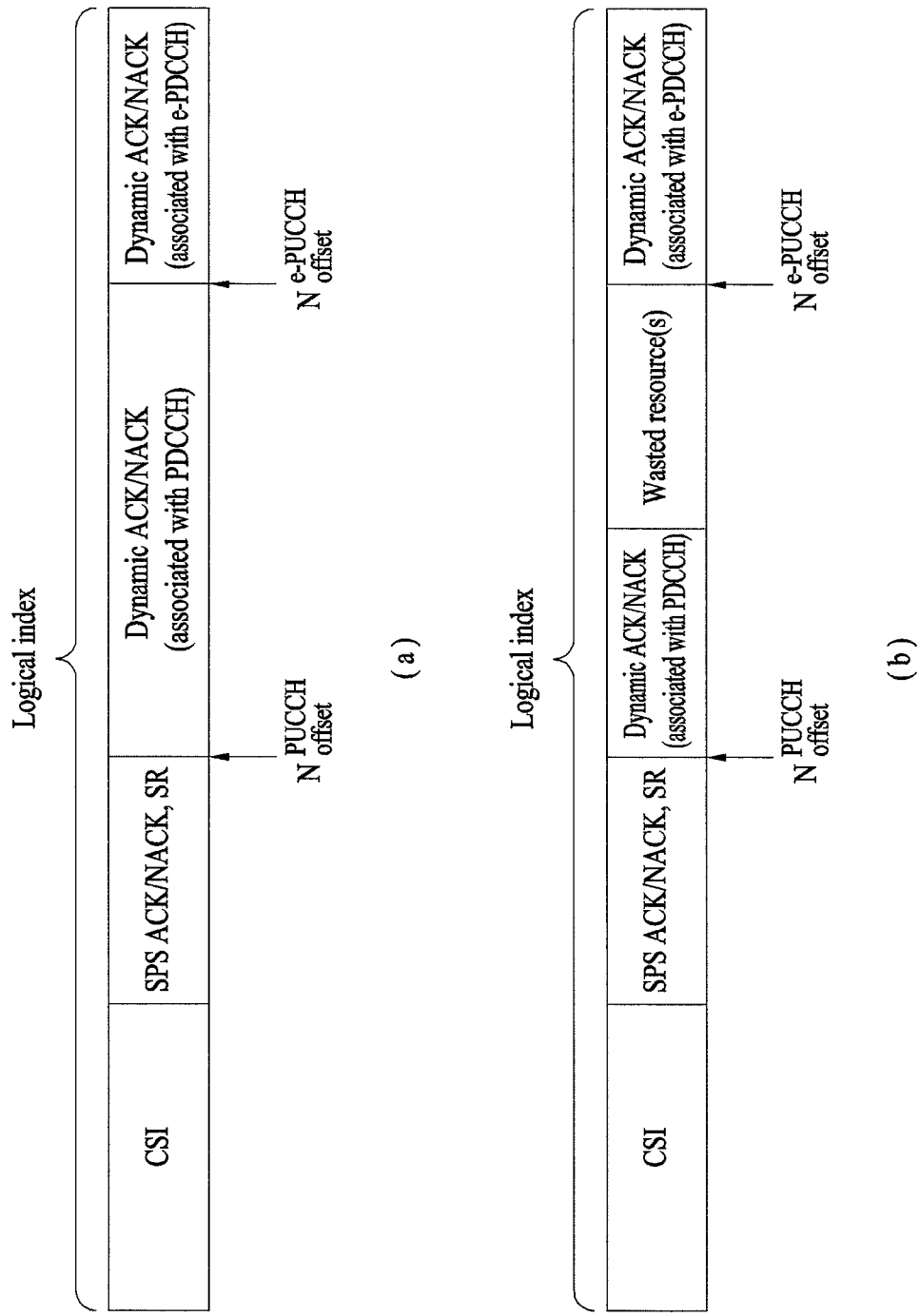
FIG. 12 illustrates logical arrangement of PUCCH resources.

FIG. 12 illustrates logical arrangement of PUCCH resources.

Referring to FIG. 12, resources used for a PUCCH are arranged in order of PUCCH resources for CSI, PUCCH resources for semi-persistent scheduling (SPS) ACK/NACK and SR, and PUCCH resources for dynamic ACK/NACK (i.e. dynamically allocated PUCCH resources linked with a PDCCH).

Referring to FIG. 12(a), a BS may transmit $N^{PUCCH}_{offset}$, indicating a start logical index of indexes used for dynamic ACK/NACK resources among logical indexes sequentially assigned to the PUCCH resources, to a UE by a higher layer signal. For example, $N^{(1)}_{PUCCH}$ of Equation 5 and Equation 6 may be $N^{PUCCH}_{offset}$. In a 3GPP LTE(-A) system, PUCCH resources, of which number is at least the number of CCE indexes, starting from $N^{PUCCH}_{offset}$ may be used for dynamic ACK/NACK resources. In the 3GPP LTE(-A) system, $N^{PUCCH}_{offset}$ may be determined/indicated by $N^{(2)}_{RB}$ transmitted as a higher layer signal. To dynamically allocate ACK/NACK resources using an e-PDCCH, the present invention provides an offset $N^{e-PUCCH}_{offset}$ indicating a start position of ACK/NACK PUCCH resources for the e-PDCCH or another value corresponding to $N^{e-PUCCH}_{offset}$, capable of indicating $N^{e-PUCCH}_{offset}$. The BS may transmit information indicating $N^{e-PUCCH}_{offset}$ to the UE by a higher layer signal. In this case, PUCCH resources ranging from $N^{PUCCH}_{offset}$ to $N^{e-PUCCH}_{offset}$ may be linked with PDCCH CCEs. According to the present invention, since resources linked with the PDCCH CCEs are dynamically changed, a sufficient number of ACK/NACK PUCCH resources should be reserved so that no problems occur even if the PUCCH resources are dynamically changed. In consideration of this fact, $N^{e-PUCCH}_{offset}$ which is sufficiently separated from $N^{PUCCH}_{offset}$ should be configured. However, if less dynamic ACK/NACK resources are linked with the PDCCH, unused resources among ACK/NACK PUCCH resources configured by $N^{PUCCH}_{offset}$ and $N^{e-PUCCH}_{offset}$ are wasted as illustrated in FIG. 12(b).

To solve a problem of a conventional method for allocating ACK/NACK resources for an R-PDCCH on an RRC signaling basis and a problem of an ACK/NACK resource allocation method for an e-PDCCH using the above-described $N^{e-PUCCH}_{offset}$, the present invention proposes, separately from the above method of the present invention, another method for pre-reserving a limited number of PUCCH resources by an RRC signal and dynamically allocating the PUCCH resources within the limit of the reserved resources. Hereinafter, associated embodiments for performance improvement for an R-PDCCH will be described. However, the embodiments of the present invention are applicable to all types of modifications of the PDCCH (e.g. A-PDCCH, E-PDCCH, etc.) embedded in a PDSCH region as well as the R-PDCCH. In the following description, embodiments of the present invention regarding an e-PDCCH may be implemented by replacing the R-PDCCH with the e-PDCCH and replacing the RN with the UE.

Figure 13:
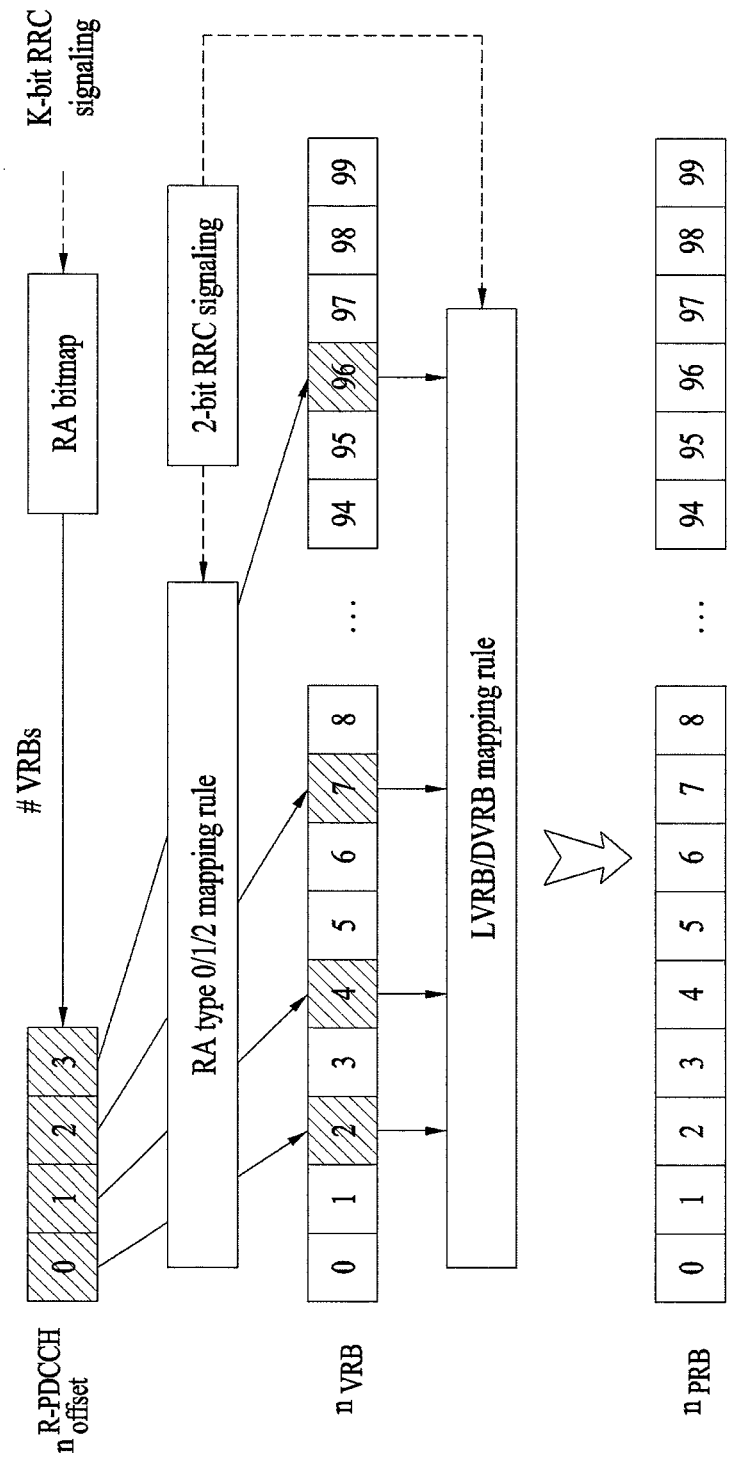
FIG. 13 illustrates the concept of mapping between an R-PDCCH and a PRB, for configuration of a search space of the R-PDCCH.

FIG. 13 illustrates the concept of mapping between an R-PDCCH and a PRB, for configuration of a search space of the R-PDCCH. Particularly, FIG. 13 illustrates a mapping relationship between a VRB number $n_{VRB}$ and a PRB number $n_{PRB}$ defined in an R-PDCCH transmission process to explain a method proposed in the present invention.

In the frequency domain, a set of $N^{R-PDCCH}_{VRB}$ VRBs for potential R-PDCCH transmission may be configured by a higher layer signal using Type 0, 1, or 2 RA described with reference to FIGS. 7 to 9. For example, for type 2 RA, mapping of VRBs to PRBs is configured by higher layers and the configured VRBs are successively assigned numbers from $n^{R-PDCCH}_{VRB}=0, 1, \ldots, N^{R-PDCCH}_{VRB}-1$. A VRB assigned $n^{R-PDCCH}_{VRB}=0$ indicates the smallest VRB number $n_{VRB}$ and a VRB assigned $n^{R-PDCCH}_{VRB}=N^{R-PDCCH}_{VRB}-1$ indicates the largest VRB number $n_{VRB}$ Referring to FIG. 13, a K-bit RA bitmap itself indicates the number of VRBs, $N^{R-PDCCH}_{VRB}$, for an R-PDCCH as described with reference to FIGS. 6 to 9. That is, the RA bitmap indicates which PRBs belong to an R-PDCCH search space. In addition, the RA bitmap represents a mapping rule of $n^{R-PDCCH}_{VRB}$ to $n_{VRB}$ and indicates whether mapping of $n_{VRB}$ to $n_{PRB}$ is allocated as a localized type or a distributed type.

Each RN monitors a reserved R-PDCCH resource region, i.e. the R-PDCCH search space (a set of $N^{R-PDCCH}_{VRB}$ VRBs), to confirm whether an R-PDCCH thereof is present. Monitoring of the R-PDCCH resource includes blind decoding of R-PDCCH candidates. If each RN detects an R-PDCCH indicated thereto, the RN performs operation according to DCI of the R-PDCCH (e.g. DL reception or UL transmission).

DCI (e.g. DL grant or UL grant) transmitted on the R-PDCCH is mapped to an R-PDCCH resource through cross-interleaving or is mapped to the R-PDCCH resource without cross interleaving. If the DCI is mapped to the R-PDCCH resource without cross-interleaving, only one R-PDCCH is transmitted on one or more RBs. If the DCI is mapped to the R-PDCCH resource through cross interleaving, a plurality of R-PDCCHs may be transmitted on one or more RBs. The BS signals to the RN whether the R-PDCCH is cross-interleaved. In the R-PDCCH search space, R-PDCCH candidates are differently defined depending on whether cross interleaving is performed. For example, if a high layer configures the R-PDCCH not to be cross-interleaved, an R-PDCCH candidate m=0, 1, . . . , M(Λ)−1 of an aggregation level Λ in each slot includes a VRB to which a number $n^{R\text{-}PDCCH}_{VRB}=(\Lambda \cdot m+i)\bmod N^{R\text{-}PDCCH}_{VRB}$ is assigned. Here, i=0, 1, . . . , Λ−1 and M(Λ) is as follows.

TABLE 7

| Aggregation level Λ | Number of R-PDCCH candidates M(Λ) |
| --- | --- |
| 1 | 6 |
| 2 | 6 |
| 4 | 2 |
| 8 | 2 |

For example, if a higher layer configures the R-PDCCH to be cross-interleaved, a process in which the RN determines R-PDCCH allocation conforms to a process in which the UE determines PDCCH allocation. However, a set of CCEs corresponding to the R-PDCCH candidates of a search space $S^{(\Lambda)}_{n,j}$ in a slot j∈{0,1} of a subframe n is as follows.

$$\Lambda \cdot \{(Y_n+m)\bmod \lfloor N_{CCE,j}^{R\text{-}PDCCH}/\Lambda \rfloor\}+i \quad \text{Equation 10}$$

where i=0, 1, . . . , Λ−1, m=0, 1, . . . , M(Λ)−1, and $N^{R\text{-}PDCCH}_{CCE,j}$ is a total number of CCEs included in a set of RBs configured for potential R-PDCCH transmission.

First Embodiment $n^{R\text{-}PDCCH}_{VRB}$ is a parameter for mapping an R-PDCCH to a PRB, which performs a function similar to a PDCCH CCE index. Nonetheless, since an R-PDCCH search space in which an RN attempts to detect an R-PDCCH is RN-specifically configured, $n^{R\text{-}PDCCH}_{VRB}$ cannot be used as a common index for determining a PUCCH resource associated with an e-PDCCH. To set $n^{R\text{-}PDCCH}_{VRB}$ to a common index, which can be commonly used in a whole cell, a first embodiment of the present invention signals a separate offset value per RN or RN group. That is, in order to map $n^{R\text{-}PDCCH}_{VRB}$ VRBs allocated to a corresponding RN or corresponding RN group to actual logical indexes of PUCCH resources, a start index of ACK/NACK PUCCH resources for the RN or RN group or a value indicating bandwidth available for ACK/NACK transmission of the RN or RN group may be transmitted from the BS to the UE as $N^{e\text{-}PDCCH}_{offset}$. In this case, it is assumed that a plurality of RNs forms the same group (e.g. RN group #n) and the same search space is configured. A PUCCH resource index corresponding to an R-PDCCH in the same group is determined by the position of an index (the concept corresponding to a CCE index of the UE) of a unit configured based on an R-PDCCH aggregation level 1 (e.g. 36 REs or 9 REGs). That is, according to the first embodiment of the present invention, an $n^{R\text{-}PDCCH}_{VRB}$ value may be configured to be mapped to a PUCCH resource 1:1 and the RN/UE may obtain a unique PUCCH resource using an $n^{R\text{-}PDCCH}_{VRB}+$ RN/UE specific offset value. $N^{PDCCH}_{offset}$ and $N^{e\text{-}PDCCH}_{offset}$ described with reference to FIG. 12 are cell-specifically provided values and the same $N^{e\text{-}PDCCH}_{offset}$ is provided to all RNs or UEs. However, according to the first embodiment of the present invention, $N^{e\text{-}PDCCH}_{offset}$ is UE/RN specifically or UE/RN group specifically provided. In more detail, while the BS transmits the same $N^{PDCCH}_{offset}$ and/or $N^{e\text{-}PDCCH}_{offset}$ to all UEs using RRC dedicated offset signaling in FIG. 12, a different offset value per UE (or UE group) is configured to signal an actual PUCCH resource index to which an $n^{R\text{-}PDCCH}_{VRB}$ value is mapped in the first embodiment.

For example, referring to FIG. 13, when 4 VRBs are configured for potential R-PDCCH transmission, at least 4 PUCCH resources starting from $N^{e\text{-}PDCCH}_{offset}$ provided for a specific RN may be linked to 4 VRBs by $n^{R\text{-}PDCCH}_{VRB}$. The specific RN may detect an R-PDCCH and transmit ACK/NACK for the R-PDCCH or a PDSCH scheduled by the R-PDCCH, using the PUCCH resources linked by the R-PDCCH VRB index $n^{R\text{-}PDCCH}_{VRB}$ Second Embodiment As another embodiment of the present invention, the present invention proposes a second embodiment for dynamically allocating an ACK/NACK PUCCH resource for an R-PDCCH using $n_{VRB}$ or $n_{PRB}$ already having characteristics of a cell common index. That is, an R-PDCCH VRB index $n^{R\text{-}PDCCH}_{VRB}$ configured by $n_{VRB}$ or $n_{PRB}$ is mapped to $n_{VRB}$ or $n_{PRB}$ so as to be used as an index for PUCCH resource allocation. In other words, according to the second embodiment of the present invention, $n_{VRB}$ or $n_{PRB}$ is mapped to PUCCH resources 1:1. In this case, the lowest index (or highest index) in the PUCCH resources corresponds to $n_{VRB}=0$ or $n_{PRB}=0$ and the highest index (or lowest index) in the PUCCH resources corresponds to $n_{VRB}=N^{R\text{-}PDCCH}_{VRB}-1$ or $n_{PRB}=N^{R\text{-}PDCCH}_{VRB}-1$. In the case of one-to-one mapping, as many PUCCH resources as the number of RBs configured for potential PUCCH transmission are reserved. To reduce the number of reserved PUCCH resources, in one aspect of the second embodiment of the present invention, a plurality of $n_{VRB}$ or $n_{PRB}$ may correspond to one PUCCH resource. That is, in one aspect of the second embodiment of the present invention, an N:1 mapping form is maintained to reduce the number of reserved resources so that N VRBs or PRBs are mapped to one PUCCH resource. Here, N may be pre-configured or may be configured according to a communication situation. N may be configured as, for example, 4, 3, or 2, in consideration of an RBG. In the case of 4 RBGs, if one R-PDCCH in an RBG is scheduled to be allocated, only one ACK/NACK resource per RBG is reserved. For example, in a 100-RB system in which one RBG includes 4 RBs, 25 ACK/NACK resources may be reserved. If there is no predefined rule, one or more R-PDCCHs are present in an RBG and thus several RNs use the same ACK/NACK resource. In this case, collision may occur. To minimize such collision, a PHICH grouping method used to map a UL RB index and a PHICH index in a 3GPP LTE(-A) system may be applied to PUCCH resources associated with an R-PDCCH.

Third Embodiment

As a further embodiment of the present invention, a third embodiment for allocating new numbers to signaled search space sets is proposed. According to the third embodiment of the present invention, each of all RNs configures an R-PDCCH VRB index $n^{R\text{-}PDCCH}_{VRB}$ and common indexes are configured by applying the configured R-PDCCH VRB indexes per RN and an offset value received by each RN. The RN may be aware of a PUCCH resource index mapped to a common index using a common index corresponding to $n^{R\text{-}PDCCH}_{VRB}$ in which an R-PDCCH is detected and may dynamically use the PUCCH resource. For the third embodiment of the present invention, an RRC signal indicating the lowest index or size (i.e. offset value) of a search space per RN is needed as in the above first embodiment.

Fourth Embodiment

A wireless system may be configured to exclusively use only one of the PDCCH and the e-PDCCH in one DL subframe such that a subframe in which only a PDCCH is used and a subframe in which only an e-PDCCH is used. For the case in which a system is defined not to simultaneously use the PDCCH and the e-PDCCH in one DL subframe, the present invention proposes the following method.

Figure 14:
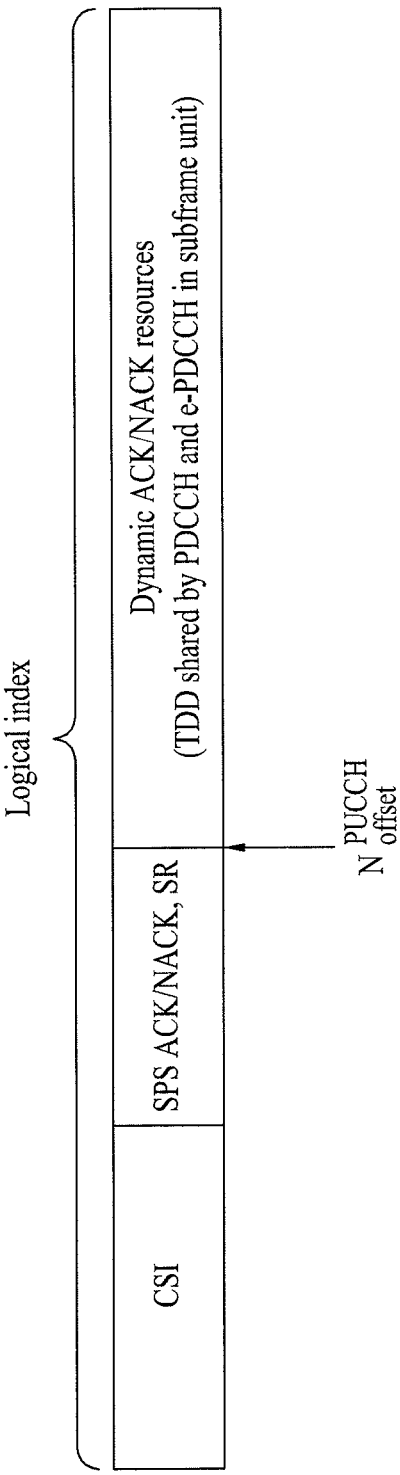
FIG. 14 is a diagram explaining an embodiment of the present invention for allocating an ACK/NACK resource for an e-PDCCH.

FIG. 14 is a diagram explaining an embodiment of the present invention for allocating an ACK/NACK resource for an e-PDCCH.

A PUCCH resource in a subframe in which only a PDCCH is present may be dynamically allocated using $N^{PUCCH}_{offset}$. The present invention proposes a fourth embodiment using PUCCH resources reserved by $N^{PUCCH}_{offset}$ as PUCCH resources for an e-PDCCH in a subframe in which only the e-PDCCH (e.g. R-PDCCH) is present. Referring to FIG. 14, according to the fourth embodiment of the present invention, the same PUCCH resources, regardless of the PDCCH or e-PDCCH, are shared by a time division multiplexing (TDD) scheme for ACK/NACK transmission associated with the PDCCH and ACK/NACK transmission associated with the e-PDCCH. The fourth embodiment of the present invention can prevent resources from being unnecessarily reserved in two exclusive regions. To implement the fourth embodiment of the present invention, the BS may inform the UE of a signal indicating in which subframe only the PDCCH is present or in which subframe only the e-PDCCH is present through a higher layer signal such as an RRC signal. Alternatively, the BS may configure a different $N^{PUCCH}_{offset}$ value in each subframe and may signal the value to the UE. If there are less e-PDCCHs and thus less reserved e-PDCCH resources so that waste is negligible, it is possible to configure an independent PUCCH resource for the e-PDCCH.

The above-described first to fourth embodiments relate to a method for configuring common indexes capable of being linked to PUCCH resource indexes in order to pre-reserve a limited number of PUCCH resources by an RRC signal and to dynamically allocate the PUCCH resources within the limit the reserved resources. In other words, the first to fourth embodiments of the present invention relate to a method for configuring common indexes to be linked to the other PUCCH resources except for PUCCH resources for CSI, SPS ACK/NACK, and SR transmission, i.e. except for PUCCH resources from logical PUCCH resource index 0 to $N^{PUCCH}_{offset}-1$, among PUCCH resources.

The BS may configure a search space for an e-PDCCH of a specific RN/UE in a data region of a DL subframe according to any one of the first to fourth embodiments and provide the UE with offset information indicating an index of a start PUCCH resource among PUCCH resources associated with the configured search space for the e-PDCCH, the size of PUCCH resources associated with the configured search space for the e-PDCCH, or the bandwidth size available for PUCCH resources associated with the configured search space for the e-PDCCH. The RN/UE may determine a PUCCH resource for ACK/NACK corresponding to an e-PDCCH based on an index of a resource included in the e-PDCCH (e.g. CCE index, VRB index, etc.) among the PUCCH resources reserved for the search space of the e-PDCCH therefor based on the offset information.

Hereinafter, a fifth embodiment of the present invention will be described for configuring a different number of ACK/NACK resources and/or a different mapping rule according to the candidate position and/or aggregation level of the e-PDCCH in a single search space configured according to the aforementioned first to fourth embodiments.

Fifth Embodiment

FIG. 15 is a diagram explaining another embodiment of the present invention for allocating an ACK/NACK resource for an e-PDCCH.

Referring to FIG. 15, for example, we assume that there are 6, 6, 2, and 2 e-PDCCH candidate positions of aggregation levels 1, 2, 4, and 8, respectively, in one search space. In this case, the BS configures a search space composed of 16 RBs. Among the 16 RBs, the BS may configure 6 candidate positions of aggregation level 1 using 6 RBs, configure 6 candidate positions of aggregation level 2 using 12 RBs, configure two candidate positions of aggregation level 4 using 8 RBs, and configure two candidate positions of aggregation level 8 using 16 RBs. In this case, it is assumed that candidate positions of each aggregation level are used in RB index order starting from a low index among the configured RB sets.

FIG. 15(a) illustrates mapping of one ACK/NACK resource per RB. In FIG. 15(a), a total of 16 ACK/NACK resources should be reserved. However, this causes excessive ACK/NACK resource reservation. For example, in RBs corresponding to candidate positions 0, 1, and 2 of aggregation level 2, two candidate positions of aggregation level 1 are defined per candidate position. If one candidate position of aggregation level 2 is configured, a total of two ACK/NACK resources, one for each of two RBs, should be reserved.

In the meanwhile, in RBs corresponding to candidate positions 3, 4, and 5 of aggregation level 2, since candidate positions of aggregation level 1 are not defined, one ACK/NACK resource is sufficient per RB. As a result, referring to FIG. 15(b), even if a total of 9 ACK/NACK resources is reserved, an e-PDCCH candidate defined in a corresponding search space guarantees an independent ACK/NACK resource so that the amount of reserved ACK/NACK resources can be reduced. That is, even if the search space is composed of a predetermined number of resource units, the BS may reserve PUCCH resources less than the predetermined number for ACK/NACK transmission for the e-PDCCH. The BS may transmit information indicating the number and/or positions of the reserved PUCCH resources to a corresponding RN/UE according to any one of the first to fourth embodiments.

In the fifth embodiment of the present invention, one ACK/NACK resource is mapped to a candidate position of the lowest aggregation level among candidate positions sharing a specific RB in a given search space (in more detail, among candidate positions sharing a specific RB as a start RB of aggregated RBs). Then, a smaller number of ACK/NACK resources than the number of RBs belonging to a corresponding search space is reserved.

The aforementioned fifth embodiment of the present invention exemplifies the case in which an aggregation unit of a search space is an RB. However, the aggregation unit of the search space can be a CCE as in a legacy PDCCH and the aggregation unit may be a resource unit of another size.

Sixth Embodiment

Meanwhile, if a MIMO scheme is used, one or more R-PDCCHs/e-PDCCHs may be present in the same RB or RBG and thus collision between the PUCCH resources is expected. In this case, the BS may differently configure scrambling IDs or antenna ports used to decode the R-PDCCHs/e-PDCCHs and use information about the scrambling IDs or antenna ports to allocate the PUCCH resources. Candidates of the scrambling IDs or antenna ports used to decode the R-PDCCHs/e-PDCCHs may be pre-configured, provided to the UE, and then dynamically indicated using a DCI format. Alternatively, mapping between each e-PDCCH CCE and an antenna port in one PRB may be pre-defined. The mapping relationship between e-PDCCH CCEs and antenna ports in one PRB may be predefined as one pattern or, if multiple patterns are defined, pattern information may be signaled to the RN/UE. Conventionally, an ACK/NACK PUCCH resource is determined in association with only a PDCCH CCE index. According to the present embodiment, the ACK/NACK PUCCH resource is determined in association with a scrambling ID or an antenna port as well as the PDCCH CCE index. The present embodiment may be applied together with any one of the first to fifth embodiments of the present invention or may be applied alone.

Figure 16:
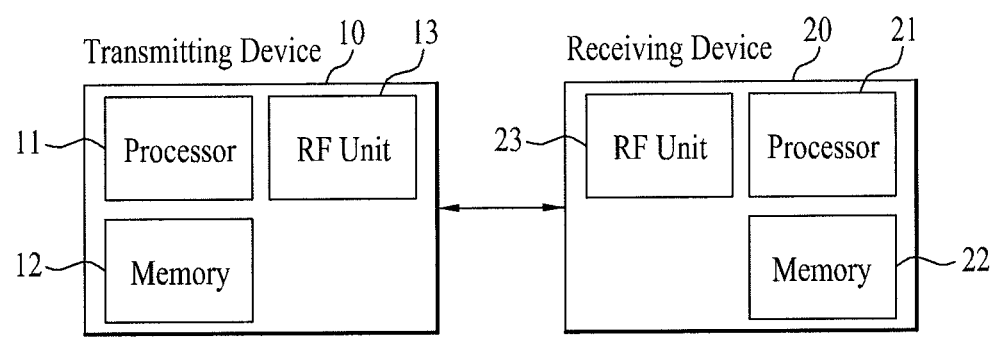
FIG. 16 is a block diagram illustrating elements of a transmitting device 10 and a receiving device 20 for implementing the present invention.

FIG. 16 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of it represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE or RN operates as the transmitting device 10 in uplink and as the receiving device 20 in downlink. In the embodiments of the present invention, a BS operates as the receiving device 20 in uplink and as the transmitting device 10 in downlink. For convenience of description, the UE or RN will be referred to as the UE hereinafter. The processor, memory, and RF unit included in the BS will be referred to as a BS processor, a BS memory, and a BS RF unit, respectively and the processor, memory, and RF unit included in the UE will be referred to as a UE processor, a UE memory, and a UE RF unit, respectively to describe the embodiments of the present invention. In the present invention, the BS processor may be a processor in the BS or a BS controller connected to the BS via cables or dedicated lines to control the BS.

Hereinafter, the above embodiments of the present invention will be described again with reference to FIG. 16.

The BS processor according to the present invention pre-reserves a limited number of ACK/NACK PUCCH resources for an e-PDCCH by an RRC signal and dynamically allocates an ACK/NACK PUCCH resource within the limit of the reserved resources. The BS processor configures an e-PDCCH search space in which the e-PDCCH is to be transmitted and controls the BS RF unit to transmit information about the e-PDCCH search space to a corresponding UE. An RA bitmap may be used as information about the e-PDCCH search space.

The BS processor according to the first embodiment of the present invention configures an additional offset value per UE or UE group in order to use $n^{e\text{-}PDCCH}{}_{VRB}$ as a cell common index and controls the BS RF unit to transmit the offset value. The offset value is a UE-specific value rather than a cell-specific value and is a value associated with the start position of PUCCH resources available for ACK/NACK transmission related to an e-PDCCH of a corresponding UE, the number of PUCCH resources, or bandwidth of PUCCH resources. The UE RF unit may receive the offset value and the information about the e-PDCCH search space from the BS and transfer the offset value and the information to the UE processor. The UE processor may perform blind decoding in the e-PDCCH search space to detect a corresponding e-PDCCH in a data region of a DL subframe, and determine a unique PUCCH resource to be used for ACK/NACK transmission associated with the e-PDCCH using an index $n^{e\text{-}PDCCH}{}_{VRB}$ of a resource included in the e-PDCCH and the offset value. The UE processor controls the UE RF unit to transmit ACK/NACK corresponding to the e-PDCCH to the BS, using the determined PUCCH resource.

The BS processor and the UE processor according to the second embodiment of the present invention use an e-PDCCH VRB index $n^{e\text{-}PDCCH}{}_{VRB}$ configured by $n_{VRB}$ or $n_{PRB}$, which is mapped to $n_{VRB}$ or $n_{PRB}$, as an index for PUCCH resource allocation. The BS processor may reserve as many PUCCH resources as the number of RBs configured for potential PUCCH transmission. Since the e-PDCCH resource unit index is mapped to $n_{VRB}$ or $n_{PRB}$, the UE may be aware of a PUCCH resource associated with $n^{e\text{-}PDCCH}{}_{VRB}$ without additional information indicating the PUCCH resource. Meanwhile, the BS processor may reserve a smaller number of PUCCH resources than the number of resource units configuring a search space by allocating N VRBs or PRBs to one PUCCH resource.

The UE processor according to the third embodiment of the present invention may configure common indexes for distinguishing between PUCCH resources by allocating new numbers to search space sets signaled by the BS. According to the third embodiment of the present invention, each UE processor configures an e-PDCCH resource unit index (e.g. $n^{e\text{-}PDCCH}{}_{VRB}$ index) and configures common indexes by applying e-PDCCH resource unit indexes per UE and an offset value received by each UE. The UE processor may be aware of a PUCCH resource index mapped to the common index using the common index corresponding to an e-PDCCH resource unit index in which an e-PDCCH is detected. For the third embodiment of the present invention, the BS processor may control the BS RF unit to transmit an RRC signal indicating the lowest index or size (i.e. offset value) of a search space per UE as in the above-described first embodiment. The UE processor may control the UE RF unit to transmit ACK/NACK corresponding to the e-PDCCH to the BS using the determined PUCCH resource.

If either a PDCCH or an e-PDCCH is exclusively used in one DL subframe, the BS processor according to the fourth embodiment of the present invention may dynamically allocate a PUCCH resource in a subframe in which only the PDCCH is present using $N^{PDCCH}{}_{offset}$ and may allocate a PUCCH resource for the e-PDCCH using PUCCH resources reserved by $N^{PDCCH}{}_{offset}$ in a subframe in which only the e-PDCCH is present. The UE processor according to the fourth embodiment of the present invention may control the UE RF unit to transmit ACK/NACK information regarding the (e-)PDCCH or a PDSCH scheduled by the (e-)PDCCH, using a PUCCH resource linked to a resource index in which the (e-)PDCCH is detected irrespective of the e-PDCCH or PDCCH.

In a single search space according to the fifth embodiment of the present invention, ACK/NACK resources linked according to a candidate position and/or an aggregation level of an e-PDCCH may be differently configured. For example, referring to FIG. 15, the BS processor may configure a total of 16 RBs. Instead of reserving 16 ACK/NACK resources corresponding one by one to the 16 RBs, the BS processor may reserve one ACK/NACK resource at a candidate position having the lowest aggregation level among candidate positions sharing a specific RB in the search space (in more detail, among candidate positions sharing a specific RB as a start RB of aggregated RBs). If the BS processor allocates an e-PDCCH for a UE to one of candidate positions sharing a specific RB, for example, candidate position 3 of aggregation level 2, candidate position 1 of aggregation level 4, and candidate position 0 of aggregation level 8 in FIG. 15(b), the UE processor detects the e-PDCCH from any one of these candidate positions. Irrespective of whether the detected e-PDCCH has candidate position 3 of aggregation level 2, candidate position 1 of aggregation level 4, or candidate position 0 of aggregation level 8, the UE processor controls the UE RF unit to transmit ACK/NACK for the e-PDCCH to the BS using the same ACK/NACK resource.

The BS processor according to the sixth embodiment of the present invention may differently configure a scrambling ID or antenna port used for decoding an e-PDCCH and may control the BS RF unit to transmit information about the configured scrambling ID or antenna port to the UE. The UE processor may determine a PUCCH resource to be used for ACK/NACK transmission associated with the e-PDCCH using the scrambling ID or antenna port as well as an index of a resource unit in which the e-PDCCH is detected. The UE processor controls the UE RF unit to transmit ACK/NACK corresponding to the e-PDCCH to the BS using the determined PUCCH resource.

Meanwhile, the UE RF unit may receive a PDCCH search space in which a PDCCH transmitted in a control region of a DL subframe is to be detected and an offset value indicating ACK/NACK PUCCH resources associated with the PDCCH search space. The UE processor may detect a PDCCH thereof by performing blind decoding in the PDCCH search space and determine a PUCCH resource used for ACK/NACK transmission corresponding to the PDCCH using the first CCE index in the PDCCH and the offset value (e.g. $N^{PDCCH}{}_{offset}$). The UE processor controls the UE RF unit to transmit ACK/NACK corresponding to the PDCCH to the BS using the determined PUCCH resource.

The BS processor may be aware of a PUCCH resource used by the UE to transmit ACK/NACK information for an e-PDCCH or a PDSCH scheduled by the e-PDCCH, based on a resource index included in the e-PDCCH and an offset value $N^{PDCCH}{}_{offset}$. Therefore, the BS processor may control the BS RF unit to receive ACK/NACK information from the UE using a PUCCH resource determined based on the resource index included in the e-PDCCH and the offset value $N^{PDCCH}{}_{offset}$, which are transmitted to the UE.

According to the embodiments of the present invention, a PUCCH resource for an e-PDCCH can be efficiently used.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The embodiments of the present invention are applicable to a BS, an RN, a UE, or other devices in a wireless communication system.

What is claimed is:

1. A method for transmitting an uplink signal by a user equipment in a wireless communication system, comprising:
   receiving, by the user equipment, an enhanced physical downlink control channel (EPDCCH);
   receiving, by the user equipment, a physical downlink shared channel (PDSCH) based on the EPDCCH; and
   transmitting acknowledgement/negative acknowledgement (ACK/NACK) information corresponding to the PDSCH using a PUCCH resource,
   wherein the PUCCH resource is determined based on an index of an enhanced control channel element (eCCE) for an EPDCCH and an index of an antenna port used for EPDCCH transmission.

2. The method according to claim 1, wherein the index of the antenna port used for the EPDCCH is used for decoding the EPDCCH.

3. The method according to claim 1, wherein the index of the antenna port is used for transmission of the EPDCCH.

4. The method according to claim 1, wherein the PUCCH resource is determined further based on offset information.

5. The method according to claim 4, wherein the offset information indicates a PUCCH resource starting offset associated with a set of resource blocks configured for the user equipment to attempt to detect the EPDCCH in the set of resource blocks.

6. The method according to claim 4, wherein the offset information is signaled by higher layer signaling.

7. The method according to claim 1, wherein the EPDCCH is received in a data region of a subframe which is divided into a control region available for reception of a legacy PDCCH and the data region in a time domain.

8. A user equipment for transmitting an uplink signal in a wireless communication system, comprising:
   a radio frequency (RF) unit; and
   a processor configured to control the RF unit,
   wherein the processor controls the RF unit to receive an enhanced physical downlink control channel (EPDCCH), controls the RF unit to receive a physical downlink shared channel (PDSCH) based on the EPDCCH and controls the RF unit to transmit acknowledgement/negative acknowledgement (ACK/NACK) information corresponding to the PDSCH using a physical uplink control channel (PUCCH) resource,
   wherein the PUCCH resource is determined based on an index of an enhanced control channel element (eCCE) for an EPDCCH and an index of an antenna port used for EPDCCH transmission.

9. The user equipment according to claim 8, wherein the index of the antenna port used for the EPDCCH is used for decoding the EPDCCH.

10. The user equipment according to claim 8, wherein the index of the antenna port is used for transmission of the EPDCCH.

11. The user equipment according to claim 8, wherein the PUCCH resource is determined further based on offset information.

12. The user equipment according to claim 11, wherein the offset information indicates a PUCCH resource starting offset associated with a set of resource blocks configured for the user equipment to attempt to detect the EPDCCH in the set of resource blocks.

13. The user equipment according to claim 11, wherein the offset information is signaled by higher layer signaling.

14. The user equipment according to claim 8, wherein the EPDCCH is received in a data region of a subframe which is divided into a control region available for reception of a legacy PDCCH and the data region in a time domain.

* * * * *